United States Patent
Kijima

(10) Patent No.: US 9,607,230 B2
(45) Date of Patent: Mar. 28, 2017

(54) MOBILE OBJECT CONTROL APPARATUS AND TARGET OBJECT DETECTING APPARATUS

(71) Applicant: HONDA MOTOR CO., LTD., Minato-Ku, Tokyo (JP)

(72) Inventor: Yoshitaka Kijima, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 38 days.

(21) Appl. No.: 14/684,514

(22) Filed: Apr. 13, 2015

(65) Prior Publication Data

US 2015/0302260 A1    Oct. 22, 2015

(30) Foreign Application Priority Data

Apr. 16, 2014  (JP) ................. 2014-085005
Apr. 16, 2014  (JP) ................. 2014-085006

(51) Int. Cl.
| | | |
|---|---|---|
| G06F 19/00 | (2011.01) | |
| G06F 7/70 | (2006.01) | |
| G06G 7/00 | (2006.01) | |
| G06G 7/76 | (2006.01) | |
| G06K 9/00 | (2006.01) | |
| G08G 1/16 | (2006.01) | |
| B60W 30/09 | (2012.01) | |
| G06T 7/246 | (2017.01) | |

(52) U.S. Cl.
CPC ......... *G06K 9/00805* (2013.01); *B60W 30/09* (2013.01); *G06T 7/251* (2017.01); *G08G 1/166* (2013.01); *B60W 2420/42* (2013.01); *B60W 2550/10* (2013.01); *G06T 2207/20061* (2013.01); *G06T 2207/30241* (2013.01); *G06T 2207/30261* (2013.01)

(58) Field of Classification Search
CPC ....... B60W 30/09; G06T 7/2046; G08G 1/166
USPC .......................................................... 701/70
See application file for complete search history.

(56) References Cited

U.S. PATENT DOCUMENTS 8,301,344 B2 * 10/2012  Simon ...................... B60R 1/00
                                                     701/45
2001/0045981 A1   11/2001  Gloger et al.

FOREIGN PATENT DOCUMENTS

| DE | 10025678 A1 | 12/2001 |
|---|---|---|
| DE | 10336638 A1 | 2/2005 |
| DE | 102011011870 A1 | 8/2011 |
| JP | 2003-203291 A | 7/2003 |
| JP | 2004-192553 A | 7/2004 |

* cited by examiner

*Primary Examiner* — Maceeh Anwari
(74) *Attorney, Agent, or Firm* — Carrier Blackman & Associates, P.C.; Joseph P. Carrier; Jeffrey T. Gedeon

(57) ABSTRACT

A mobile object control apparatus includes a movement predictor and a mobile object controller. If a specific object having at least one tire is detected, the movement predictor starts to predict a movement of the specific object. The mobile object controller controls the behavior of a mobile object in view of the movement of the specific object that is predicted by the movement predictor.

11 Claims, 18 Drawing Sheets

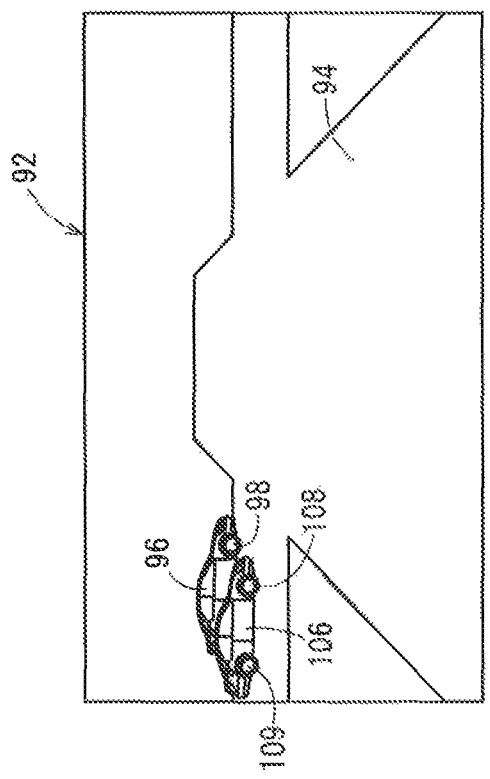
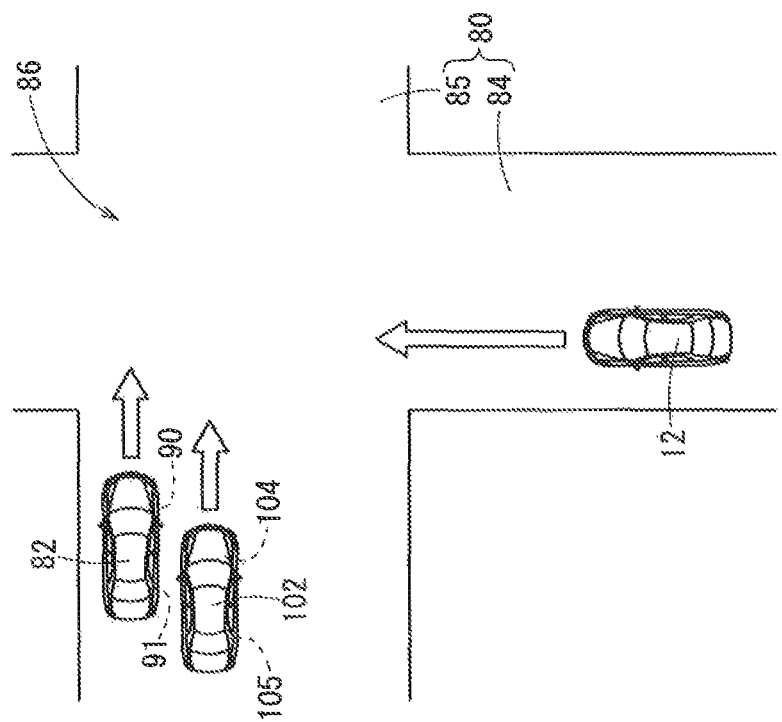

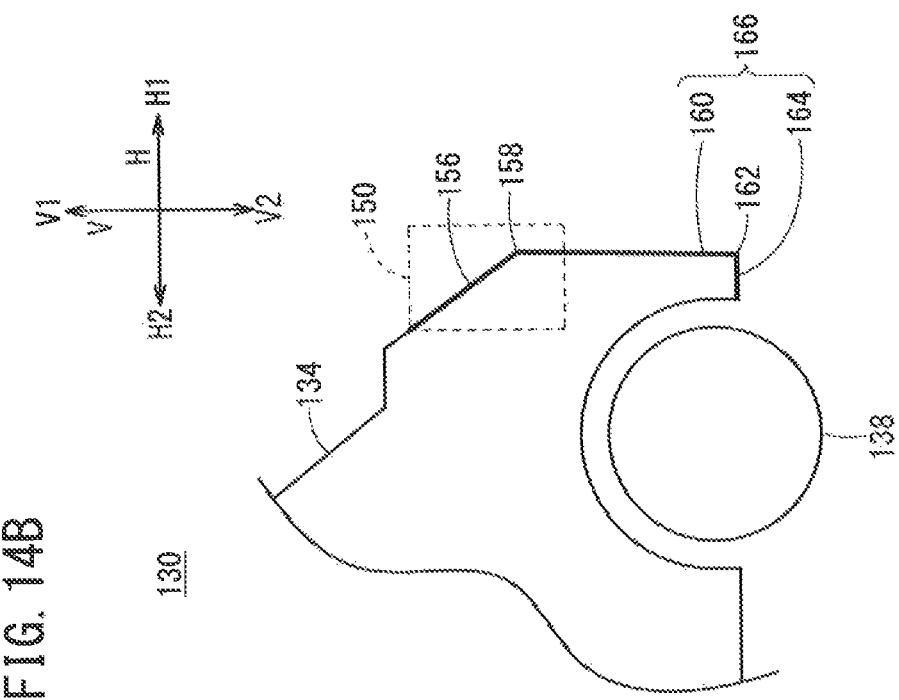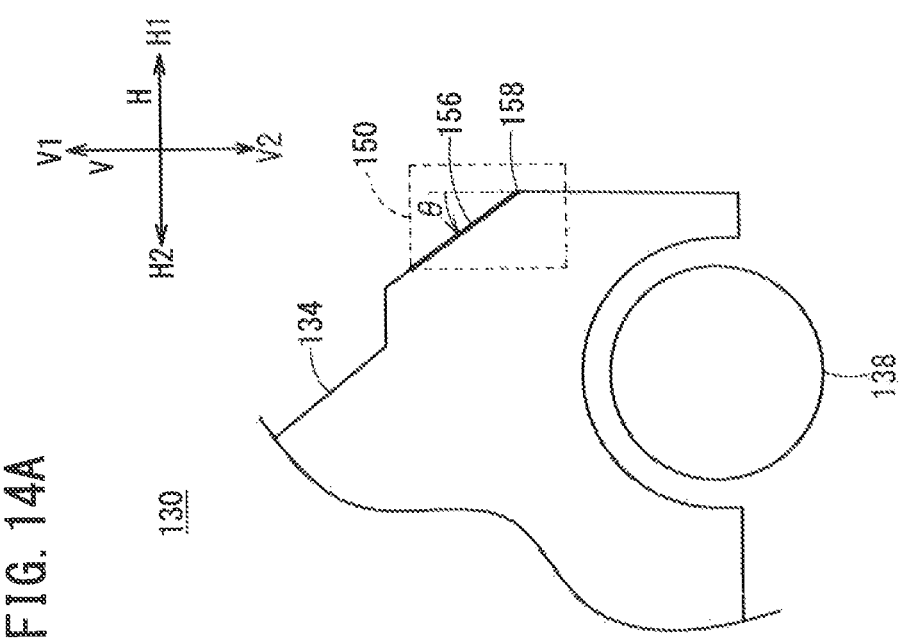

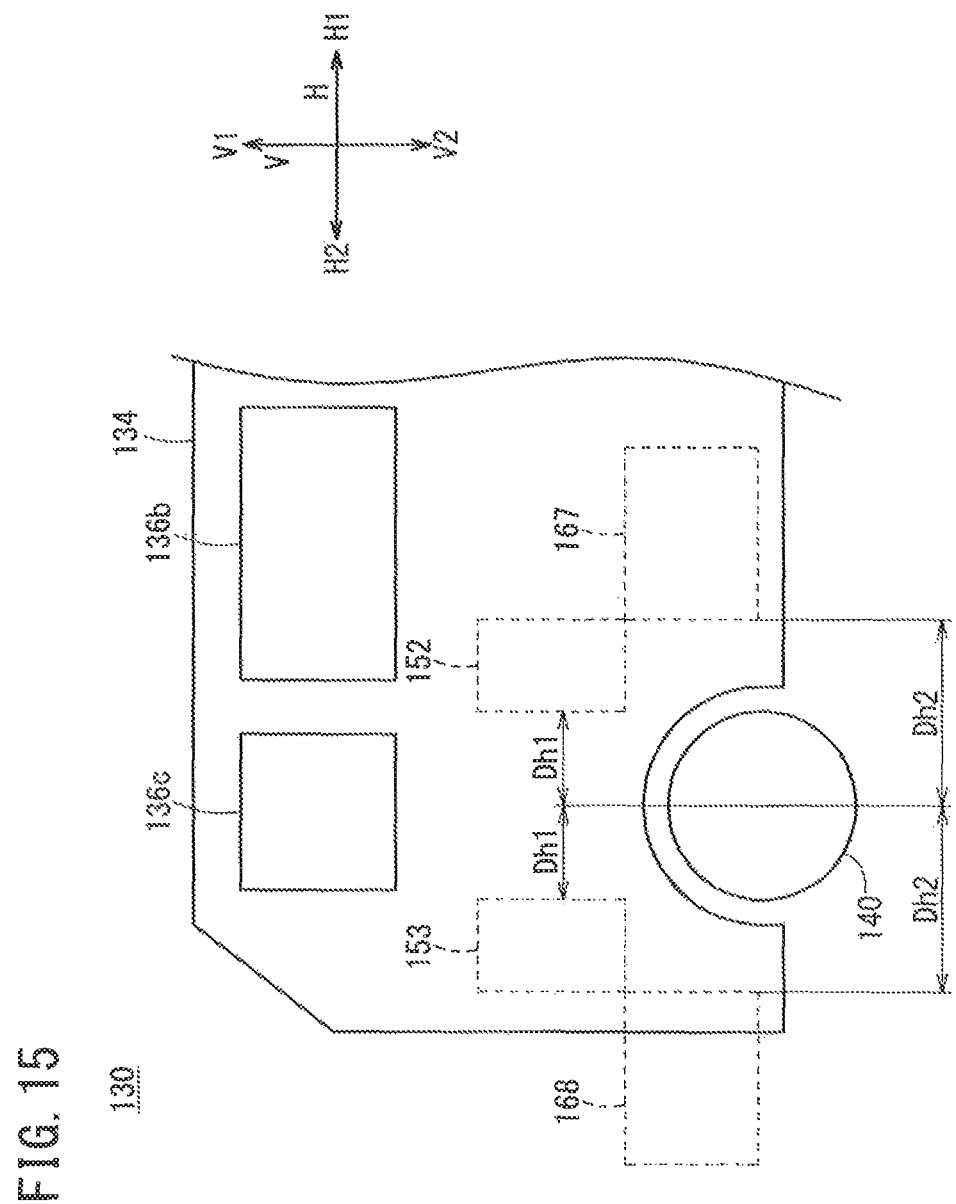

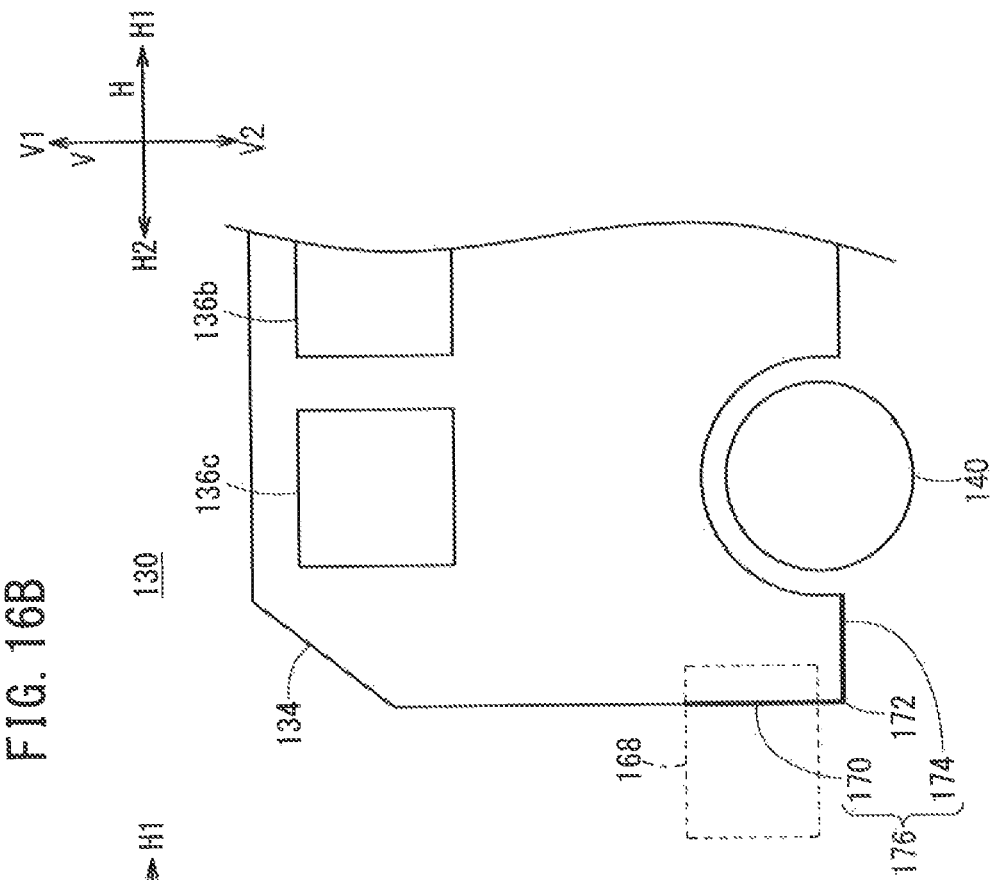
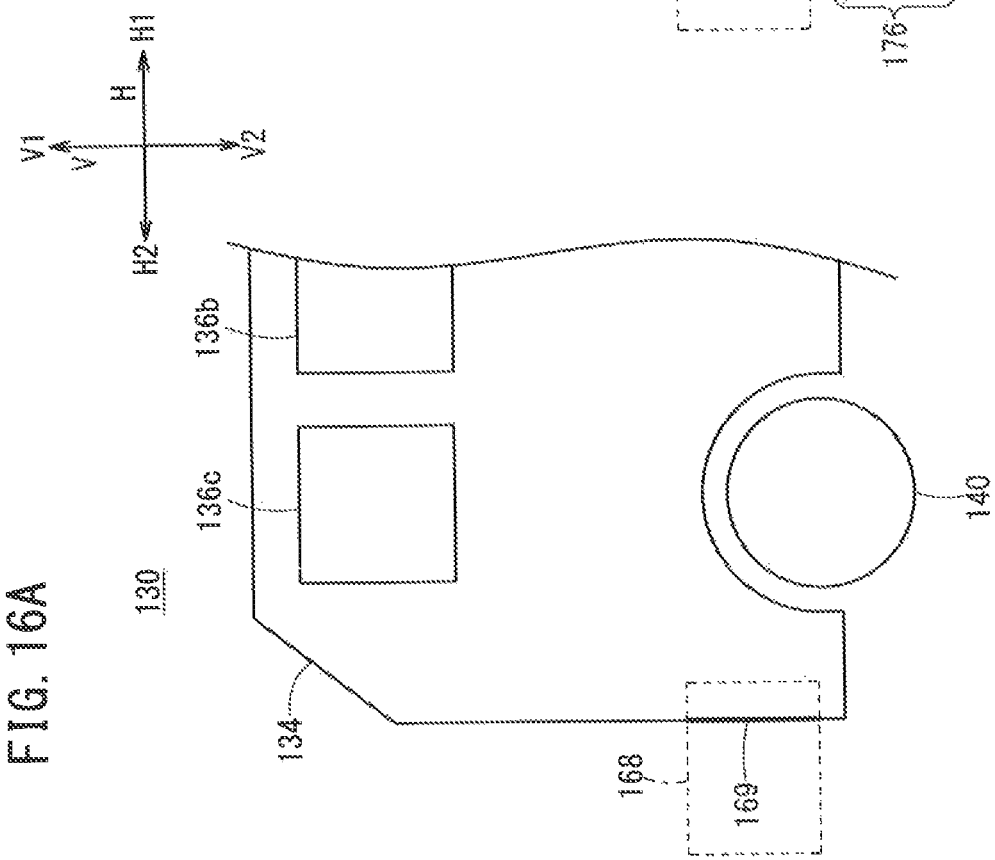

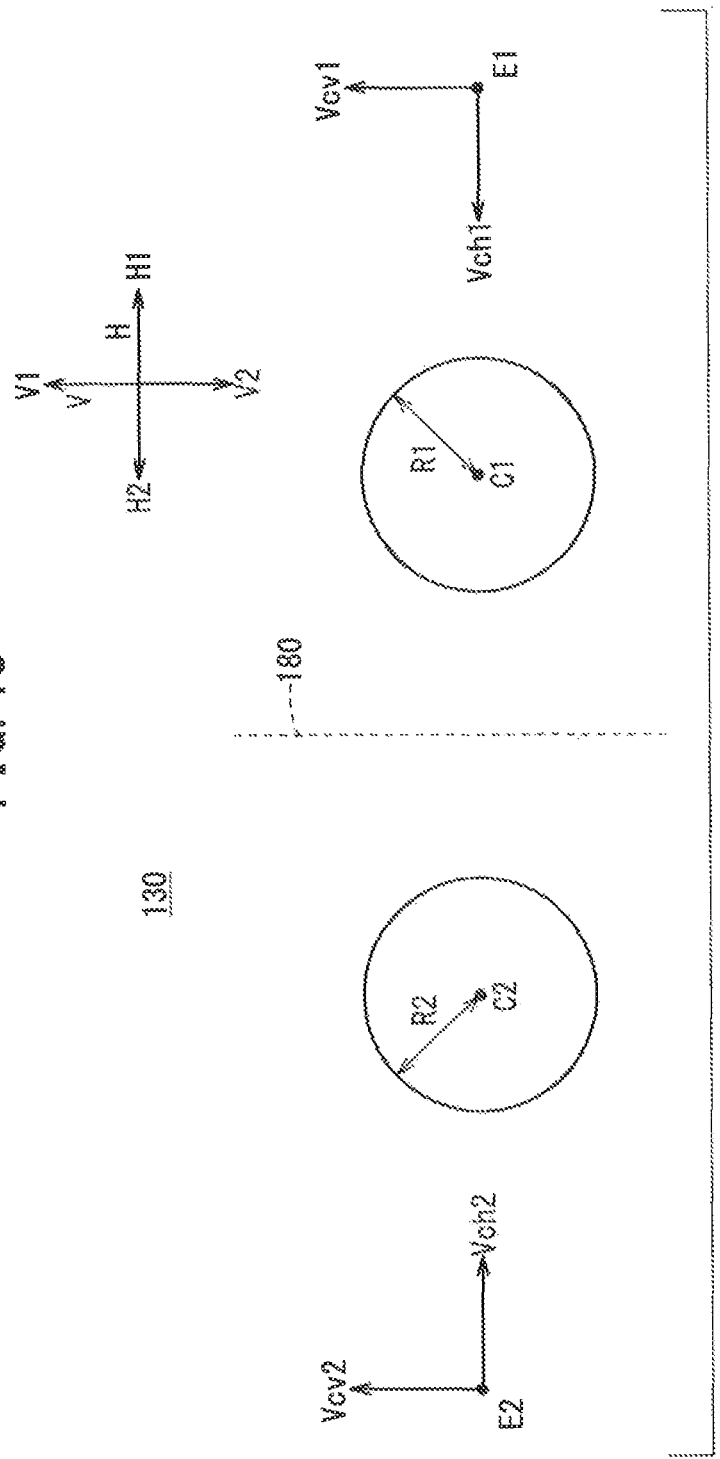

MOBILE OBJECT CONTROL APPARATUS AND TARGET OBJECT DETECTING APPARATUS

CROSS-REFERENCE TO RELATED APPLICATIONS

This application is based upon and claims the benefit of priority from Japanese Patent Applications No. 2014-085005 filed on Apr. 16, 2014, and No. 2014-085006 filed on Apr. 16, 2014, the contents all of which are incorporated herein by reference.

BACKGROUND OF THE INVENTION

Field of the Invention

The present invention relates to a mobile object control apparatus for detecting a target object from within a captured image of the periphery of a mobile object, and for controlling the behavior of the mobile object in view of the detected target object. The present invention further relates to a target object detecting apparatus for detecting a specific target object from within a captured image obtained by an image capturing unit.

Description of the Related Art

Various technologies have been developed for detecting the peripheral state of a user's own vehicle (one form of a mobile object) with an external sensor (including an image capturing unit) and detecting a target object on the basis of a signal obtained from the sensor. In such technologies, a problem is known in that significant time is needed to recognize the mobile object.

SUMMARY OF THE INVENTION

The present invention has been devised with the aim of solving the aforementioned problems, and has the object of providing an apparatus which is capable of shortening the time required to recognize a mobile object.

In order to achieve this object, there is provided in accordance with the present invention a mobile object control apparatus including an image capturing unit configured to acquire a captured image representing an area around the periphery of a mobile object, the capturing image being captured while the mobile object is moving, a target object detecting unit configured to detect a specific object having a tire as a target object on the basis of the captured image acquired by the image capturing unit, a movement predicting unit configured to start to predict a movement of the specific object if the target object detecting unit detects the specific object having at least one tire, and a mobile object control unit configured to control a behavior of the mobile object in view of the movement of the specific object that is predicted by the movement predicting unit.

Since the mobile object control apparatus has the target object detecting unit configured to detect a specific object having a tire as a target object on the basis of the captured image, the time for recognizing the mobile object can be shortened. Furthermore, since the target object detection unit is provided, together with the movement predicting unit configured to start to predict a movement of the specific object if the target object detecting unit detects the specific object having at least one tire, the mobile object control apparatus is capable of quickly starting to predict a movement of the specific object that is highly likely to be a mobile object, thereby resulting in an increase in reliability and time responsiveness for predicting a movement of the specific object. Consequently, the mobile object control apparatus ensures that sufficient time is available for taking an action or performing an operation in order to avoid contact with the target object, i.e., the specific object.

The movement predicting unit preferably predicts whether or not a possibility exists for the specific object to contact the mobile object, and the mobile object control unit preferably performs a decelerating/stopping control process for decelerating or stopping the mobile object if the movement predicting unit predicts that a possibility exists for the specific object to contact the mobile object. In this manner, the mobile object is prevented in advance from contacting the specific object.

The mobile object control unit preferably performs the decelerating/stopping control process if the movement predicting unit predicts that a possibility exists for the specific object, which has at least two tires, to contact the mobile object. When the mobile object control unit carries out the decelerating/stopping control process in this manner, since the specific object having two or more tires is extremely likely to be a mobile object, the timing of the decelerating/stopping control process is significantly enhanced.

The mobile object control unit preferably performs the decelerating/stopping control process if the specific object is positioned near another target object having at least two tires, and the movement predicting unit predicts that a possibility exists for the specific object to contact the mobile object. When the mobile object control unit carries out the decelerating/stopping control process in this manner, the mobile object control apparatus is able to appropriately handle a situation in which another target object can conceal or actually conceals a portion of the specific object.

The mobile object control unit preferably performs the decelerating/stopping control process if the specific object having at least one tire moves near a stationary object as another target object, and the movement predicting unit predicts that a possibility exists for the specific object to contact the mobile object. When the mobile object control unit carries out the decelerating/stopping control process in this manner, the mobile object control apparatus is able to appropriately handle a situation in which the specific object jumps out from behind a stationary object.

The target object detecting unit preferably includes a tire profile recognizer for recognizing a tire profile, which represents a shape of the tire, from within profile information of the captured image, an end recognizer for recognizing an end profile, which represents the shape of a horizontal end of the specific object that is positioned near the tire profile, and a type determiner for classifying the tire profile, which was recognized by the tire profile recognizer, and the end profile, which was recognized by the end recognizer, into a profile group, and determining a number of tires that the specific object has on the basis of a horizontal symmetry of each member of the profile group. Accordingly, a feature of the specific object, which indicates whether or not the specific object is a mobile object, or which indicates the number of tires of the specific object, can be detected with a high level of accuracy, even though the utilized image processing technique is highly simple.

As described above, the mobile object control apparatus according to the present invention has the object detecting unit configured to detect a specific object having a tire as a target object on the basis of the captured image, and the movement predicting unit configured to start to predict a movement of the specific object if the target object detecting unit detects the specific object having at least one tire. Therefore, the mobile object control apparatus is capable of quickly starting to predict a movement of the specific object, which is highly likely to be a mobile object, thus resulting in an increase in reliability and time responsiveness for predicting a movement of the specific object. Consequently, the mobile object control apparatus ensures that sufficient time is available for taking an action or performing an operation to avoid contact with the target object, i.e., the specific object.

In order to achieve the aforementioned object, there is provided in accordance with the present invention a target object detecting apparatus including profile extracting unit configured to acquire a profile image by performing a profile extracting process on a captured image in which a mobile object having a tire is included, tire profile recognizing unit configured to recognize a tire profile, which represents a shape of the tire, from within the profile image acquired by the profile extracting unit, and mobile object end recognizing unit configured to recognize an end profile, which represents a horizontal end of the mobile object positioned near the tire profile that was recognized by the tire profile recognizing unit. In this case, the mobile object end recognizing unit further includes a first search range establisher for establishing a first search range for searching for the end profile, at a position spaced from the position of the tire profile by a horizontal distance that is equal to or less than a threshold value, and which is spaced upwardly vertically from the position of the tire profile, and the mobile object end recognizing unit determines whether or not at least a portion of the end profile exists within the first search range, thereby recognizing the end profile.

Inasmuch as the mobile object end recognizing unit includes the first search range establisher for establishing a first search range for searching for the end profile, at a position spaced from the position of the tire profile by a horizontal distance that is equal to or less than a threshold value, and which is spaced upwardly vertically from the position of the tire profile, and the mobile object end recognizing unit determines whether or not at least a portion of the end profile exists within the first search range, it is possible to determine whether or not the end profile exists on the basis of an area profile that is spaced from the tire profile by a distance which is greater in a vertically upward direction than in a horizontal direction. As a consequence, the accuracy with which the tire profile and the end profile can be differentiated and recognized is increased. Further, provided that the captured image is used, the accuracy with which the end position of the mobile object can be detected is increased, even if the mobile object is of a different type or the position and/or posture of the mobile object is changed. As a result, the time required to recognize the mobile object can be shortened.

The mobile object end recognizing unit preferably searches within the first search range for a segmental component, which extends in one direction, and thereafter searches for a first vertical component, which extends downwardly along a vertical direction or a direction inclined within an allowable range to the vertical direction, from a lower endpoint of the segmental component, thereby recognizing the end profile. In this manner, the accuracy with which a substantially L-shaped edge (joined combination of the segmental component and the first vertical component) can be recognized is increased.

The mobile object end recognizing unit preferably further includes a second search range establisher for establishing a second search range for searching for the end profile, at a position spaced from the position of the tire profile by a horizontal distance that is greater than the threshold value, and if the mobile object end recognizing unit fails to recognize the end profile that was searched for within the first search range, the mobile object end recognizing unit preferably determines whether or not at least a portion of the end profile exists within the second search range established by the second search range establisher, thereby recognizing the end profile. In this case, since two search ranges are established in respective different positions, the search process can be carried out successively in the first search range and then in the second search range. Consequently, the required amount of processing is smaller than if the search process were carried out simultaneously in the two search ranges.

The mobile object end recognizing unit preferably searches within the second search range for a second vertical component, which extends downwardly along a vertical direction or a direction inclined within an allowable range to the vertical direction, thereby recognizing the end profile. In this manner, the accuracy with which a vertically extending edge area (second vertical component) can be recognized is increased.

The target object detecting apparatus preferably further includes a type determiner for determining a type of the mobile object depending on whether the mobile object end recognizing unit has searched for the end profile in the first search range or the second search range. In this manner, a specific morphological feature, i.e., the type, of the mobile object can be acquired.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 8A is a second plan view showing a positional relationship between a user's own vehicle and other vehicles traveling near a crossroads;

FIG. 8B is a second image view represented by a captured image signal;

FIGS. 14A and 14B are fragmentary schematic views illustrating a search process for searching for an end profile within the first search ranges;

FIG. 15 is a schematic view illustrating a process of establishing second search ranges;

FIGS. 16A and 16B are fragmentary schematic views illustrating a search process for searching for an end profile within the second search ranges;

FIG. 18 is a schematic diagram illustrating an axisymmetrical relationship among profile groups.

DESCRIPTION OF THE PREFERRED EMBODIMENTS

A mobile object control apparatus and a target object detecting apparatus according to a preferred embodiment of the present invention will be described in detail below with reference to the accompanying drawings.

[Overall Configuration of User's Own Vehicle 12 in which Driving Assistance Apparatus 10 is Incorporated]

Figure 1:
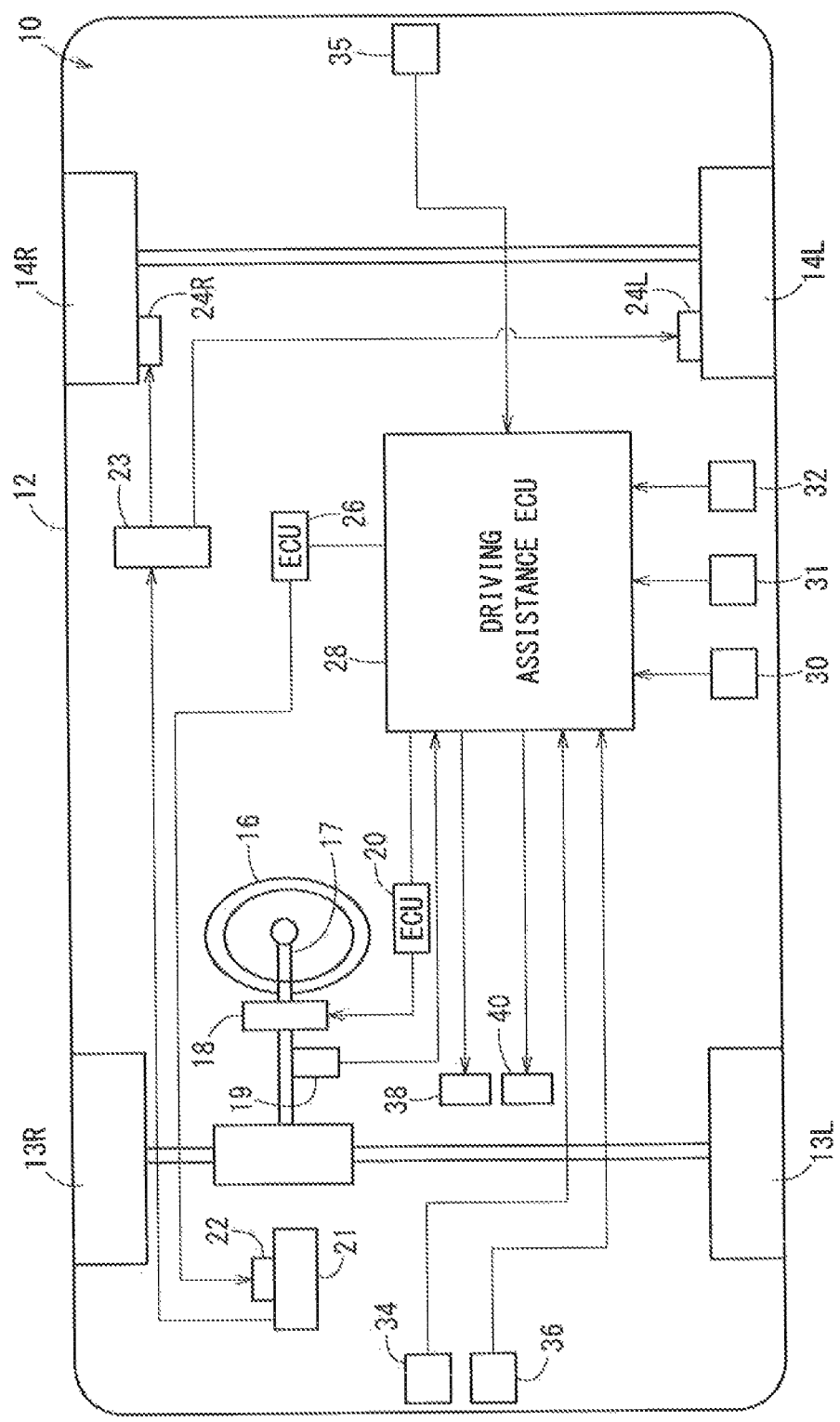
FIG. 1 is a schematic diagram showing an overall configuration of a vehicle in which a driving assistance apparatus is incorporated as a mobile object control apparatus and a target object detecting apparatus according to an embodiment of the present invention.

FIG. 1 schematically shows the overall configuration of a vehicle 12 (hereinafter referred to as a "user's own vehicle 12") in which a driving assistance apparatus 10 is incorporated as a mobile object control apparatus and a target object detecting apparatus according to an embodiment of the present invention. The user's own vehicle 12, which is a four-wheeled car, includes a right front wheel 13R, a left front wheel 13L, a right rear wheel 14R, and a left rear wheel 14L.

The user's own vehicle 12 includes a steering wheel 16, a steering shaft 17 on which the steering wheel 16 is mounted, a steering actuator 18 for turning the steering shaft 17, a steering angle sensor 19 for detecting a turning angle (steering angle) of the steering shaft 17, and an electronic control unit 20 (hereinafter referred to as an "ECU 20") for carrying out an electronic power steering control process. The steering actuator 18 that operates the steering wheel 16 is connected electrically to the ECU 20.

The user's own vehicle 12 also includes a brake pedal 21, a pedal actuator 22 for turning the brake pedal 21, a hydraulic pressure control device 23 for producing a braking hydraulic pressure corresponding to an angle at which the brake pedal 21 is depressed, brake actuators 24R, 24L for generating braking forces for wheels, e.g., the right rear wheel 14R and the left rear wheel 14L, depending on the produced braking hydraulic pressure, and an electronic control unit 26 (hereinafter referred to as an "ECU 26") for performing an electronic braking control process. The pedal actuator 22 that operates the brake pedal 21 is connected electrically to the ECU 26.

The user's own vehicle 12 further includes an electronic control unit 28 (hereinafter referred to as a "driving assistance ECU 28") for carrying out various control processes that assist the driver in driving the user's own vehicle 12. Each of the ECU 20, the ECU 26, and the driving assistance ECU 28 is constituted by a computer having a central processing unit (CPU) and a memory. The ECUs 20 and 26 are electrically connected to the driving assistance ECU 28, and acquire signals (hereinafter referred to as "guidance signals") from the driving assistance ECU 28, which are used for guiding the user's own vehicle 12 in order to avoid contact with target objects.

A yaw rate sensor 30 for detecting a yaw rate, a global positioning system (GPS) sensor 31 for detecting a present position of the user's own vehicle 12, and a vehicle speed sensor 32 for detecting a vehicle speed of the user's own vehicle 12 are each connected electrically to the driving assistance ECU 28.

Cameras 34, 35 for generating signals (hereinafter referred to as "captured image signals"), which represent captured images of areas in front of and behind the user's own vehicle 12, are disposed respectively at front and rear end portions of the user's own vehicle 12. The captured image signals are supplied sequentially from the cameras 34, 35 to the driving assistance ECU 28.

A distance sensor 36 is disposed on a front end portion of the user's own vehicle 12, e.g., near a front grill, for emitting electromagnetic waves, such as millimeter waves or the like, in an outward direction in front of the user's own vehicle 12, and for detecting the distance up to an obstacle based on characteristics of reflected waves received by the distance sensor 36. The distance sensor 36 sequentially supplies signals representing the received reflected waves to the driving assistance ECU 28.

The user's own vehicle 12 includes a passenger compartment in which there are accommodated a speaker 38 for producing speech sounds for announcements, and a touch panel display 40 for displaying images captured by the cameras 34, 35 together with map information, etc.

Figure 4:
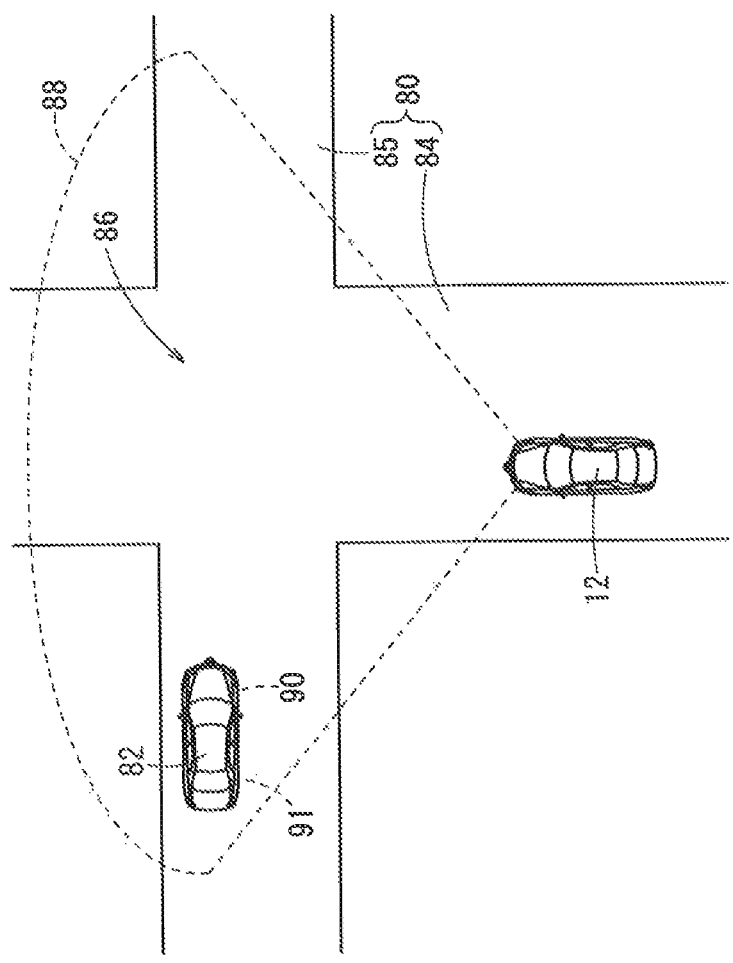
FIG. 4 is a first plan view showing a positional relationship between a user's own vehicle and another vehicle traveling near a crossroads.

On the basis of the detected signals from the various sensors described above, the driving assistance ECU 28 recognizes a peripheral situation around the user's own vehicle 12, and controls the brake pedal 21 through the ECU 26 and the pedal actuator 22. Separately or in combination with control of the brake pedal 21, the driving assistance ECU 28 also controls the steering wheel 16 through the ECU 20 and the steering actuator 18. By controlling the brake pedal 21 and the steering wheel 16 in this manner, the driving assistance ECU 28 performs a driving assistance control process in order to prevent the user's own vehicle 12 from contacting an object, e.g., another vehicle 82, as shown in FIG. 4.

[Functional Blocks of Driving Assistance Apparatus 10]

Figure 2:
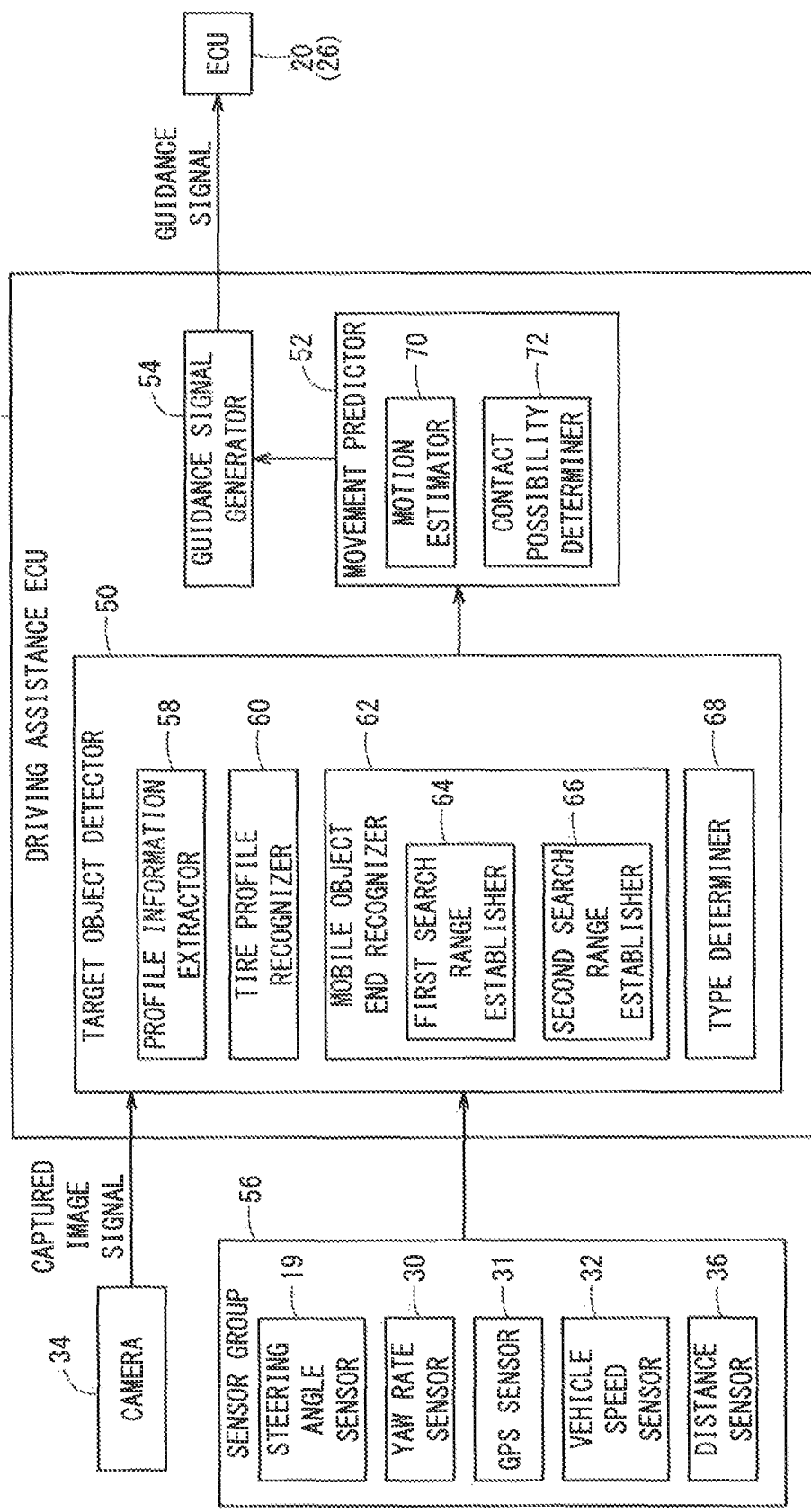
FIG. 2 is a functional block diagram of the driving assistance apparatus shown in FIG. 1.

FIG. 2 is a functional block diagram of the driving assistance apparatus 10 shown in FIG. 1. As shown in FIG. 2, the driving assistance ECU 28 functions as a target object detector 50 (target object detecting unit), a movement predictor 52 (movement predicting unit), and a guidance signal generator 54.

The target object detector 50 detects whether or not target objects exist around the periphery of the user's own vehicle 12, and also detects the types of the target objects, if any, on the basis of captured image signals from the camera 34 and sensor signals from a sensor group 56. The sensor group 56 may include all or some of the steering angle sensor 19, the yaw rate sensor 30, the GPS sensor 31, the vehicle speed sensor 32, and the distance sensor 36 (see FIG. 1). Further, a detecting unit other than those described above may be included.

More specifically, the target object detector 50 includes a profile information extractor 58, a tire profile recognizer 60, a mobile object end recognizer 62 (also referred to simply as an "end recognizer", including a first search range establisher 64 and a second search range establisher 66), and a type determiner 68. The specific functions of such components will be described later.

The movement predictor 52 predicts a movement of a target object to be monitored (hereinafter also referred to as a "monitored target object") from among target objects detected by the target object detector 50. More specifically, the movement predictor 52 includes a motion estimator 70 for estimating a motion of the monitored target object, and a contact possibility determiner 72 for determining whether or not a possibility exists for the user's own vehicle 12 to contact the monitored target object.

The guidance signal generator 54 generates guidance signals for guiding the user's own vehicle 12 in view of the prediction results from the movement predictor 52, and outputs the generated guidance signals to the ECUs 20, 26. The phrase "guiding the user's own vehicle 12" covers not only a situation of automatically driving the user's own vehicle 12, but also a situation of prompting the driver of the user's own vehicle 12 to undertake actions to move the user's own vehicle 12. The ECUs 20, 26 function as a mobile object control unit that controls the behavior of a mobile object (i.e., the user's own vehicle 12).

[Operations of Driving Assistance Apparatus 10]

An operation sequence of the driving assistance apparatus 10 shown in FIGS. 1 and 2 will be described below with reference to the flowchart shown in FIG. 3, as well as FIGS. 4 through 9B.

FIG. 4 is a first plan view showing a positional relationship between the user's own vehicle 12 and another vehicle 82 traveling near a crossroads 80. The crossroads 80 shown in FIGS. 5 through 6 and FIGS. 8A through 9B applies to countries or regions in which automobiles are legally required to stay on the left side of the road.

The crossroads 80 are made up of a straight road 84 and another road 85 that crosses the straight road 84. The user's own vehicle 12 is intending to pass through an intersection 86 of the crossroads 80 while traveling straight along the road 84, whereas the other vehicle 82 is intending to pass through the intersection 86 while traveling straight along the road 85.

A sectorial region indicated by the broken line represents an image capturing range 88 (see FIG. 4) of the camera 34 (see FIG. 1). The camera 34 has an image capturing surface, which faces toward two of the four tires of the other vehicle 82, i.e., tires 90, 91, on a near side of the other vehicle 82, which faces toward the user's own vehicle 12.

Figure 3:
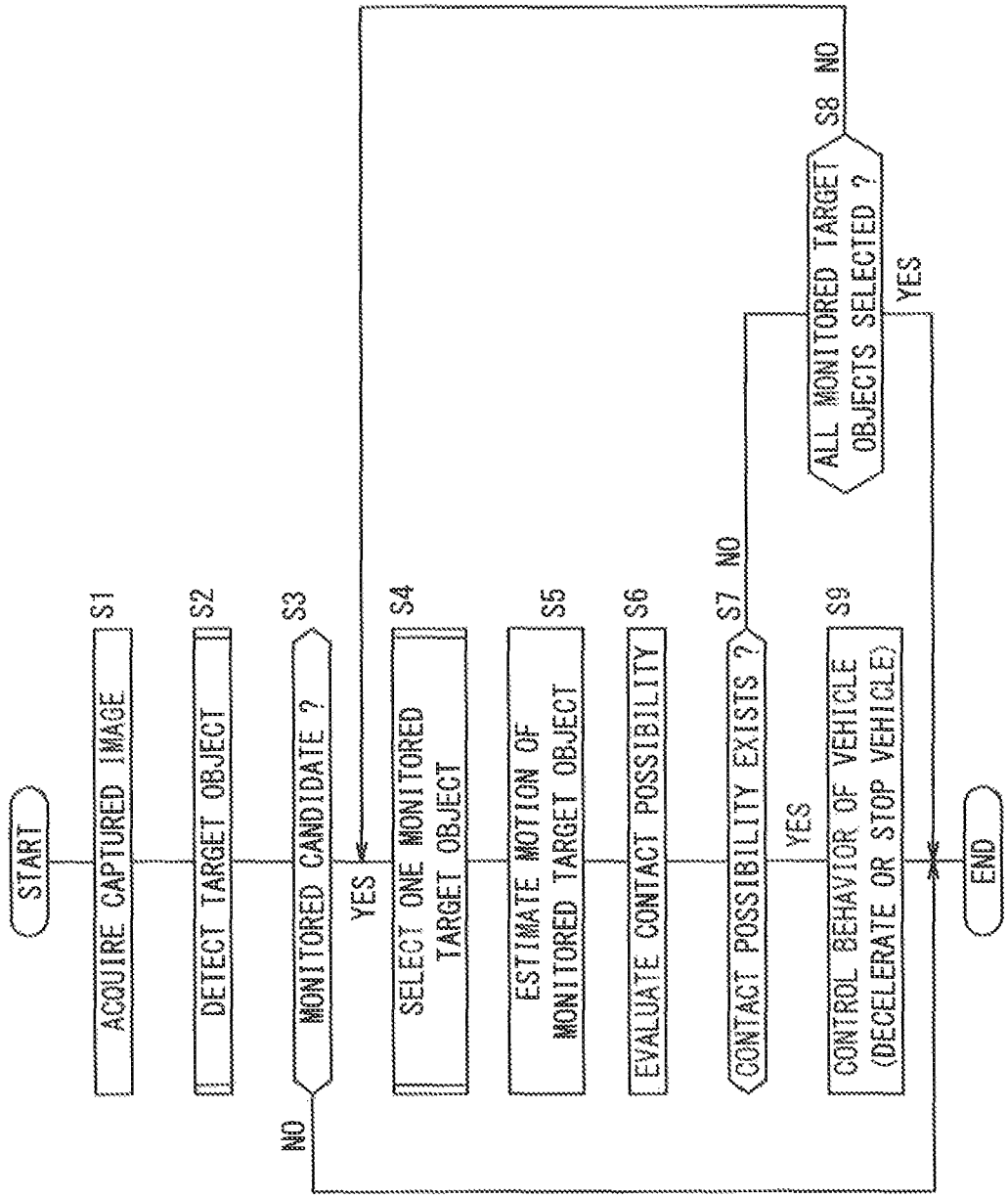
FIG. 3 is a flowchart of an operation sequence of the driving assistance apparatus shown in FIGS. 1 and 2.

In step S1 of FIG. 3, the driving assistance ECU 28 receives a frame of a captured image signal from the camera 34, thereby acquiring a captured image 92 (see FIG. 5) of an area in front of the user's own vehicle 12 within the image capturing range 88 shown in FIG. 4. If the camera 34 is an RGB camera, for example, the captured image signal from the camera 34 represents a multi-gradation image in three color channels.

Figure 5:
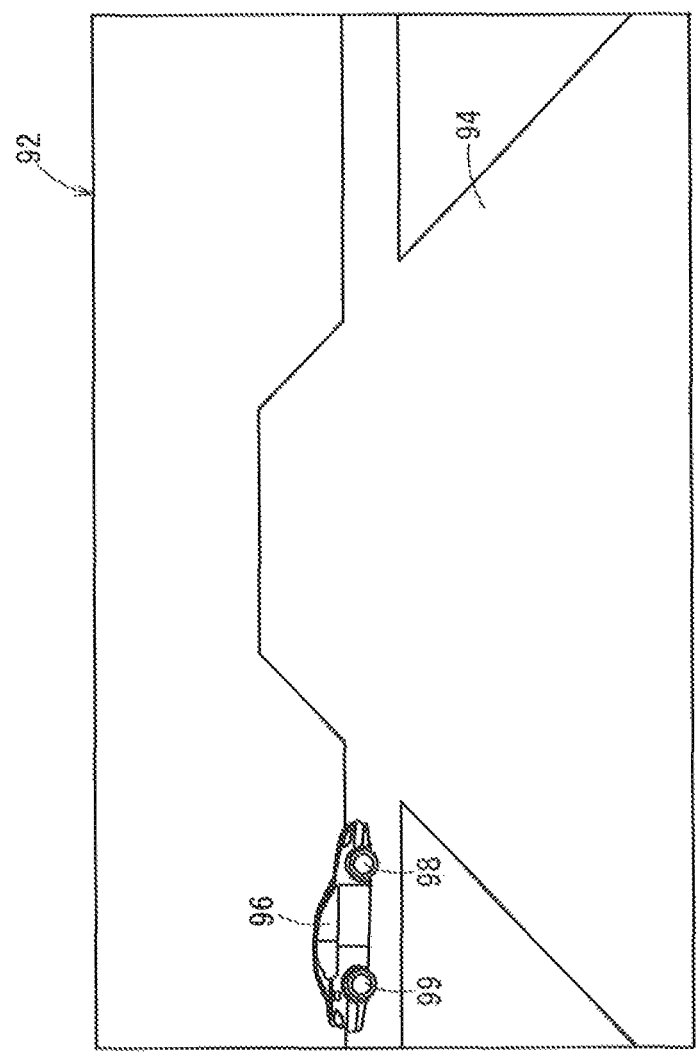
FIG. 5 is a first image view represented by a captured image signal, which is acquired through an image capturing process carried out by a camera.

As shown in FIG. 5, the captured image 92 includes a crossroads area 94, which represents a projected image of the crossroads 80, and a vehicle area 96, which represents a projected image of the other vehicle 82. The vehicle area 96 includes two substantially circular tire areas 98, 99 arranged side by side horizontally on a lower edge thereof.

In step S2, the target object detector 50 extracts a projected image having a particular shape (including the vehicle area 96 in FIG. 5) from within the captured image 92 that was acquired in step S1, detects whether or not target objects exist, and detects the types of target objects, if any. The types of target objects include, for example, human bodies, various animals (i.e., mammals such as deer, horses, sheep, dogs, cats, etc., birds, etc.) and artificial structures (i.e., mobile bodies including vehicles, as well as marks, utility poles, guardrails, walls, etc.). Details of the detecting process that is carried out by the target object detector 50 will be described later.

In step S3, the target object detector 50 determines whether or not candidates for monitored target objects (hereinafter referred to as "monitored candidates") exist within the target objects that were detected in step S2. If the target object detector 50 determines that no monitored candidate exists (step S3: NO), the driving assistance apparatus 10 terminates the driving assistance process for the acquired frame. Conversely, if the target object detector 50 determines that at least one monitored candidate exists (step S3: YES), the target object detector 50 supplies the types of monitored candidates together with positional information thereof to the movement predictor 52.

In step S4, the movement predictor 52 selects one monitored target object, which has not yet been selected, from among the monitored candidates that were determined in step S3. If the movement predictor 52 selects an existing monitored target object for the first time, the movement predictor 52 initiates a predicting process for predicting a movement of the monitored target object. The movement predictor 52 continues the predicting process until a monitored target object cannot be detected. As will be described later, since the vehicle area 96 (see FIG. 5) includes two tire areas 98, 99, the movement predictor 52 selects another vehicle 82 (see FIG. 4), which is indicated by the vehicle area 96, as a monitored target object.

In step S5, the motion estimator 70 estimates a motion of the monitored target object that was selected in step S4. The "motion" to be estimated represents, for example, whether or not the monitored target object is moving, the direction in which the monitored target object is moving, the speed at which the monitored target object is moving, the orientation or bearing of the body of the monitored target object, or a time-dependent change in each of these variables.

Figure 6:
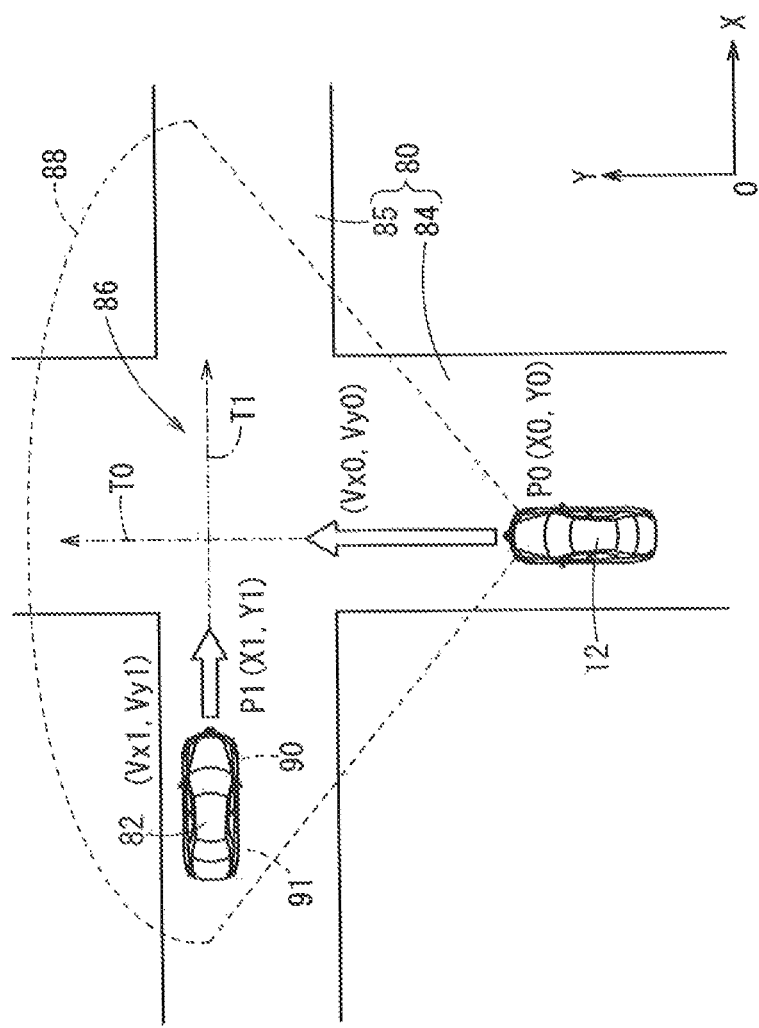
FIG. 6 is a plan view showing estimated motions of the user's own vehicle and the other vehicle.

FIG. 6 shows in plan estimated motions of the user's own vehicle 12 and the other vehicle 82. In this regard, it is assumed that the estimated motions are expressed in a plane coordinate system (XY coordinate system), and that the user's own vehicle 12 and the other vehicle 82 are represented respectively by feature points P0 (X0, Y0), P1 (X1, Y1). A velocity vector (Vx0, Vy0) of the user's own vehicle 12 can be calculated on the basis of sensor signals, e.g., a yaw rate signal and a vehicle speed signal, from the sensor group 56. A velocity vector (Vx1, Vy1) of the other vehicle 82 can be calculated by determining a displacement from the latest frame, and dividing the displacement by the frame time interval.

In step S6, based on the motion estimated in step S5, the contact possibility determiner 72 predicts and evaluates quantitatively or qualitatively whether or not a possibility exists for the user's own vehicle 12 to contact the monitored target object (hereinafter referred to as a "contact possibility"). Various known evaluating processes may be used in order to evaluate a contact possibility. For example, assuming that the velocity vector is kept constant, the contact possibility determiner 72 may determine whether or not the position of the user's own vehicle 12, which is driven along a path T0, and the position of the other vehicle 82, which is driven along a path T1, overlap each other at one time. If the time until the positions of the user's own vehicle 12 and the other vehicle 82 overlap each other is shorter, the contact possibility determiner 72 may evaluate the contact possibility as being higher. On the other hand, if the time until the positions of the user's own vehicle 12 and the other vehicle 82 overlap each other is longer, the contact possibility determiner 72 may evaluate the contact possibility as being lower.

In step S7, on the basis of the evaluation result from step S6, the contact possibility determiner 72 determines whether or not a contact possibility exists for the user's own vehicle 12 to contact the monitored target object. If the contact possibility determiner 72 determines that a contact possibility does not exist (step S7: NO), control proceeds to step S8.

In step S8, the movement predictor 52 determines whether or not all of the available monitored target objects have been selected and evaluated. If the movement predictor 52 determines that all of the monitored target objects have not yet been selected and evaluated (step S8: NO), control returns to step S4, and steps S5 through S7 are repeated on a newly selected monitored target object. Thereafter, if the movement predictor 52 determines that all of the monitored target objects have been selected and evaluated (step S8: YES), the driving assistance apparatus 10 completes the driving assistance process for the concerned frame.

If the contact possibility determiner 72 determines that a contact possibility exists for the user's own vehicle 12 to contact at least one monitored target object (step S7: YES), control proceeds to step S9.

In step S9, the driving assistance apparatus 10 (specifically, the ECU 26) performs a control process for decelerating or stopping the user's own vehicle 12 (hereinafter referred to as a "decelerating/stopping control process") if it is determined that the contact possibility exists at step S8. Prior to the decelerating/stopping control process, the guidance signal generator 54 generates a guidance signal, which is used in the decelerating/stopping control process carried out by the ECU 26, and outputs the generated guidance signal to the ECU 26. The ECU 26 supplies a drive signal to the pedal actuator 22 to thereby turn the brake pedal 21. In accordance therewith, the driving assistance apparatus 10 performs the decelerating/stopping control process in order to prevent the user's own vehicle 12 from contacting the monitored target object, i.e., the other vehicle 82, in advance.

Aside from the decelerating/stopping control process, the driving assistance apparatus 10 may be operated to guide the user's own vehicle 12. More specifically, the driving assistance apparatus 10 may turn the steering wheel 16 through the ECU 20 and the steering actuator 18 in order to change the direction of travel of the user's own vehicle 12. Alternatively, the driving assistance apparatus 10 may output speech sound information or visual information, which indicates that the monitored target object exists, to the speaker 38 or the touch panel display 40, thereby prompting the driver to take an appropriate action to operate the user's own vehicle 12.

In the foregoing manner, the driving assistance apparatus 10 completes the driving assistance process for one frame. The driving assistance apparatus 10 carries out the operation sequence of FIG. 3 in successive frame time intervals, in order to sequentially detect target objects that may exist around the periphery of the user's own vehicle 12 as the vehicle is being driven, and if necessary, to control the behavior of the user's own vehicle 12.

[Process of Selecting Monitored Target Object]

A process of selecting a monitored target object (step S4 of FIG. 3) will be described in detail below primarily with reference to FIG. 7. It is assumed that the types of monitored candidates include an object (hereinafter referred to as a "specific object") having one or two or more "tires" that are recognized.

In step S11, the movement predictor 52 determines the number of tires (hereinafter referred to as a "tire count") of a specific object. If the movement predictor 52 determines that the tire count is 2 or more (step S11: 2 OR MORE), control proceeds to step S12.

In step S12, the movement predictor 52 selects the specific object, which has a tire count of 2 or more, as a monitored target object. In the example shown in FIGS. 4 and 5, since the two tires 90, 91 (tire areas 98, 99) are recognized as existing, the other vehicle 82 is selected as a monitored target object. On the other hand, if the movement predictor 52 determines that the tire count is 1 (step S11: 1), control proceeds to step S13.

In step S13, the movement predictor 52 determines whether or not another object exists in the vicinity of the specific object. If the movement predictor 52 determines that another object exists in the vicinity of the specific object (step S13: YES), then in step S12, the movement predictor 52 selects the specific object, which has a tire count of 1, as a monitored target object. Specific examples of the above process of selecting a monitored target object will be described in detail below with reference to FIGS. 8A through 9B.

First Example

FIG. 8A is a second plan view showing a positional relationship between the user's own vehicle 12 and other vehicles 82, 102 traveling near the crossroads 80. Similar to the example shown in FIG. 4, the user's own vehicle 12 is intending to pass through the intersection 86 of the crossroads 80 while traveling straight along the road 84, whereas the other vehicles 82, 102, which are traveling parallel to each other, are intending to pass through the intersection 86 while traveling straight along the road 85. The other vehicle 82, which is positioned more remotely from the user's own vehicle 12, is driving slightly ahead of the other vehicle 102, which is positioned more closely to the user's own vehicle 12.

As shown in FIG. 8A, the image capturing surface of the camera 34 faces respectively toward two tires (tires 104, 105), which are closer to the user's own vehicle 12, from among the four tires of the other vehicle 102. As viewed from the perspective of the user's own vehicle 12, i.e., in the image capturing direction of the camera 34, the other vehicle 102 conceals a portion (including the rear tire 91) of the other vehicle 82.

As shown in FIG. 8B, in addition to the crossroads area 94 and the vehicle area 96, the captured image 92 includes a vehicle area 106, which represents a projected image of the other vehicle 102. The vehicle area 106 includes, on a lower edge thereof, two substantially circular tire areas 108, 109 arranged side by side horizontally. The vehicle area 96 includes, on a lower edge thereof, only one tire area 98, which corresponds to the front tire 90.

In the example shown in FIGS. 8A and 8B, since another object, i.e., the other vehicle 102, which has two or more tires 104, 105 (tire areas 108, 109), is recognized as existing in the vicinity of the other vehicle 82 having the tire 90 (tire area 98), the other vehicle 82 is selected as a monitored target object. In addition to the other vehicle 82, the other vehicle 102 also is selected as a monitored target object.

Second Example

Figure 9B:
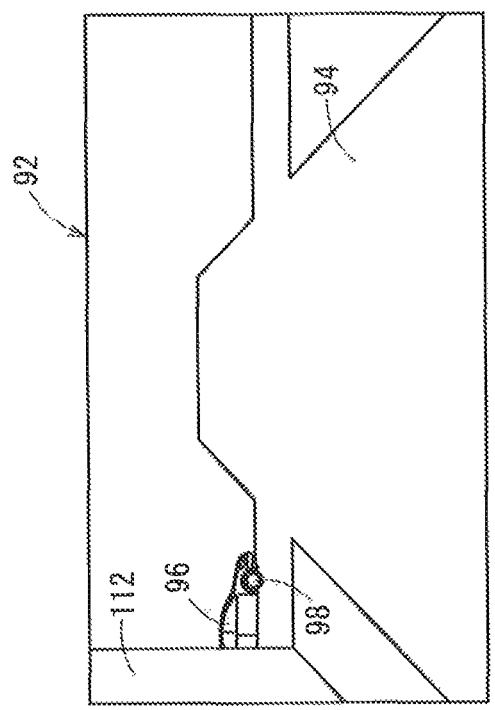
FIG. 9B is a third image view represented by a captured image signal.
Figure 9A:
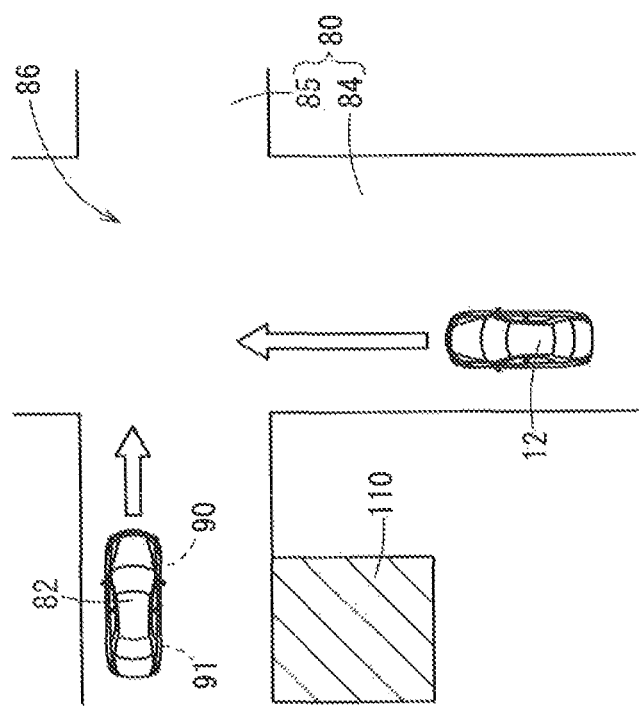
FIG. 9A is a third plan view showing a positional relationship between a user's own vehicle and another vehicle traveling near a crossroads.

FIG. 9A is a third plan view showing a positional relationship between the user's own vehicle 12 and another vehicle 82 traveling in the vicinity of the crossroads 80. Similar to the example shown in FIG. 4, the user's own vehicle 12 is intending to pass through the intersection 86 of the crossroads 80 while traveling straight along the road 84, whereas the other vehicle 82 is, as shown in FIG. 4, intending to pass through the intersection 86 while traveling straight along the road 85. Further, a stationary object 110, in particular a building in the form of a rectangular parallelepiped, exists on one side of the road 85. As shown in FIG. 9A, as viewed from the perspective of the user's own vehicle 12, i.e., in the image capturing direction of the camera 34, the stationary object 110 conceals a portion (including the rear tire 91) of the other vehicle 82.

As shown in FIG. 9B, the captured image 92 includes the crossroads area 94, the vehicle area 96, and a stationary object area 112. The vehicle area 96 includes, on a lower edge thereof, only one tire area 98, which corresponds to the front tire 90.

In the example shown in FIGS. 9A and 9B, since the other vehicle 82 having one or more tires 90 (tire area 98) is moving in the vicinity of the stationary object 110 (stationary object area 112) that represents another object, the other vehicle 82 is selected as a target object to be monitored.

Figure 7:
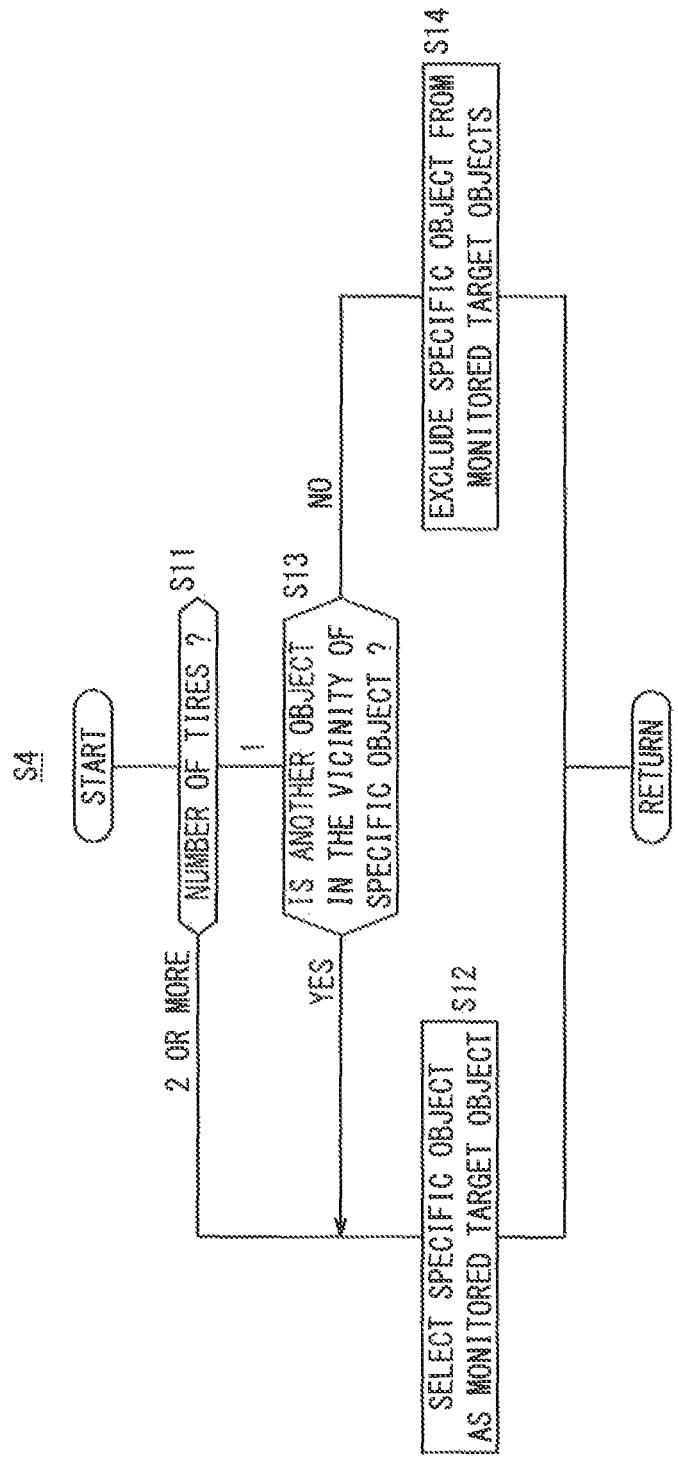
FIG. 7 is a detailed flowchart of a process of designating an object to be monitored (step S4 of FIG. 3)

Returning to step S13 of FIG. 7, if the movement predictor 52 determines that another object does not exist in the vicinity of the specific object (step S13: NO), then in step S14, the movement predictor 52 excludes the specific object whose one tire has been recognized from among the target objects to be monitored. This is because there is a high possibility that the specific object is not a vehicle, or because there is a low possibility that the specific object will come into contact with the user's own vehicle 12.

In this manner, the movement predictor 52 selects the other vehicle 82 (other vehicle 102) having two or more tires 90, 91 (tires 104, 105) that are recognized, or selects the other vehicle 82 having one tire 90 that is recognized and which satisfies certain conditions (step S4 of FIG. 3).

[First Advantage of Driving Assistance Apparatus 10]

The driving assistance apparatus 10, which serves as a mobile object control apparatus, includes the camera 34 for acquiring the captured image 92 of the periphery of the user's own vehicle 12 while the user's own vehicle 12 is moving, the target object detector 50 for detecting the other vehicle 82 (other vehicle 102) having the tires 90, 91 (tires 104, 105) as an object on the basis of the captured image 92, the movement predictor 52 for starting to predict a movement of the other vehicle 82 (other vehicle 102) if the target object detector 50 detects the other vehicle 82 (other vehicle 102) having one or more tires 90, 91 (tires 104, 105), and the ECUs 20, 26 for controlling the behavior of the user's own vehicle 12 in view of the predicted movement.

Owing to the aforementioned configuration, the time required to recognize the mobile object can be made shorter. Further, the driving assistance apparatus 10, which is configured as described above, is capable of quickly starting to predict a movement of the other vehicle 82, etc., that is highly likely to be a mobile object, thus resulting in an increase in reliability and time responsiveness for predicting a movement of the other vehicle 82. Consequently, the driving assistance apparatus 10 ensures that sufficient time is available for taking an action or performing an operation to avoid contact with the object (the other vehicle 82, etc.).

The ECU 26 may carry out the decelerating/stopping control process in the event that the movement predictor 52 predicts that a possibility exists for the specific object (the other vehicle 82) having two or more tires 90, 91 to contact the user's own vehicle 12. When the ECU 26 carries out the decelerating/stopping control process in this manner, due to the fact that the other vehicle 82 having two or more tires 90, 91 is extremely likely to be a mobile object, the timing of the decelerating/stopping control process is significantly enhanced.

The ECU 26 may also carry out the decelerating/stopping control process in the event that the specific object (the other vehicle 82) is positioned in the vicinity of another object (the other vehicle 102) having two or more tires 104, 105, and is predicted as possibly coming into contact with the user's own vehicle 12. When the ECU 26 carries out the decelerating/stopping control process in this manner, the driving assistance apparatus 10 is capable of appropriately handling a situation in which the other vehicle 102 can conceal or actually conceals a portion of the other vehicle 82.

The ECU 26 may further carry out the decelerating/stopping control process in the event that the specific object (the other vehicle 82) having one or more tires 90 moves in the vicinity of another object (stationary object 110), and is predicted as possibly coming into contact with the user's own vehicle 12. When the ECU 26 carries out the decelerating/stopping control process in this manner, the driving assistance apparatus 10 is capable of appropriately handling a situation in which the other vehicle 82 jumps out from behind the stationary object 110.

[Specific Example of Detecting Process]

Specific details of operations of the driving assistance apparatus 10 (and in particular, the target object detector 50) as the target object detecting apparatus will be described below with reference to FIGS. 10 through 18. In this regard, it is assumed that a profile extracting process is carried out on a captured image 92 (see FIG. 4, etc.) having a rectangular image area, and that an object is detected in a profile image 130 (see FIG. 10) obtained as a result of the profile extracting process.

Figure 10:
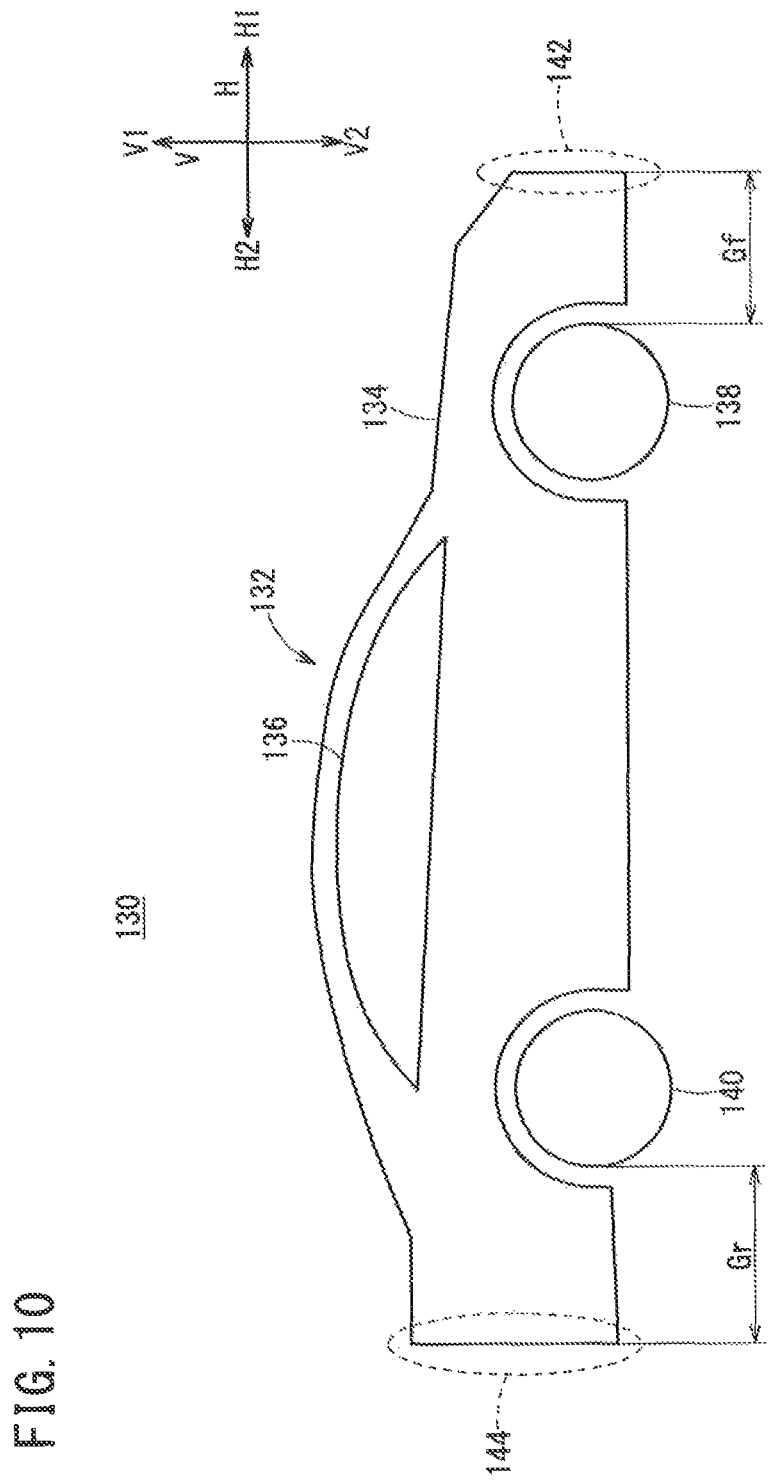
FIG. 10 is a first schematic view showing a vehicle profile included within a profile image.

FIG. 10 is a first schematic view showing a vehicle profile 132 included within the profile image 130. In FIGS. 10, 11, 13 through 16B, and 18, an axis extending along the horizontal direction of the profile image 130 is defined as an "H-axis", and rightward and leftward directions of the H-axis are indicated respectively by arrows H1 and H2. Further, an axis extending along the vertical direction of the profile image 130 is defined as a "V-axis", and upward and downward directions of the V-axis are indicated respectively by arrows V1 and V2.

The vehicle profile 132 represents the profile of a right side shape of the other vehicle 82 (see FIG. 4A, etc.: vehicle type A) having a front portion that extends in the direction of the arrow H1, and a rear portion that extends in the direction of the arrow H2. The vehicle profile 132 is composed primarily of a vehicle body profile 134 representing the shape of the vehicle body, a window profile 136 representing the shape of a window, a tire profile 138 representing the shape of the front tire 90 (see FIG. 4), and a tire profile 140 representing the shape of the rear tire 91 (see FIG. 4).

According to one specific example of a process for calculating a feature point on the vehicle profile 132, a front edge 142 of the vehicle body, which extends along the V-axis, is recognized using the position of the tire profile 138 as a key, and the position of the front edge 142 is determined. Since the distance Gf between the tire profile 138 (right endpoint) and the front edge 142 is sufficiently large, the tire profile 138 and the front edge 142 can be recognized separately.

According to the same process, a rear edge 144 of the vehicle body, which extends along the V-axis, is recognized using the position of the tire profile 140 as a key, and the position of the rear edge 144 is determined. At this time, since the distance Gr between the tire profile 140 (left endpoint) and the rear edge 144 is sufficiently large, the tire profile 140 and the rear edge 144 can be recognized separately.

Figure 11:
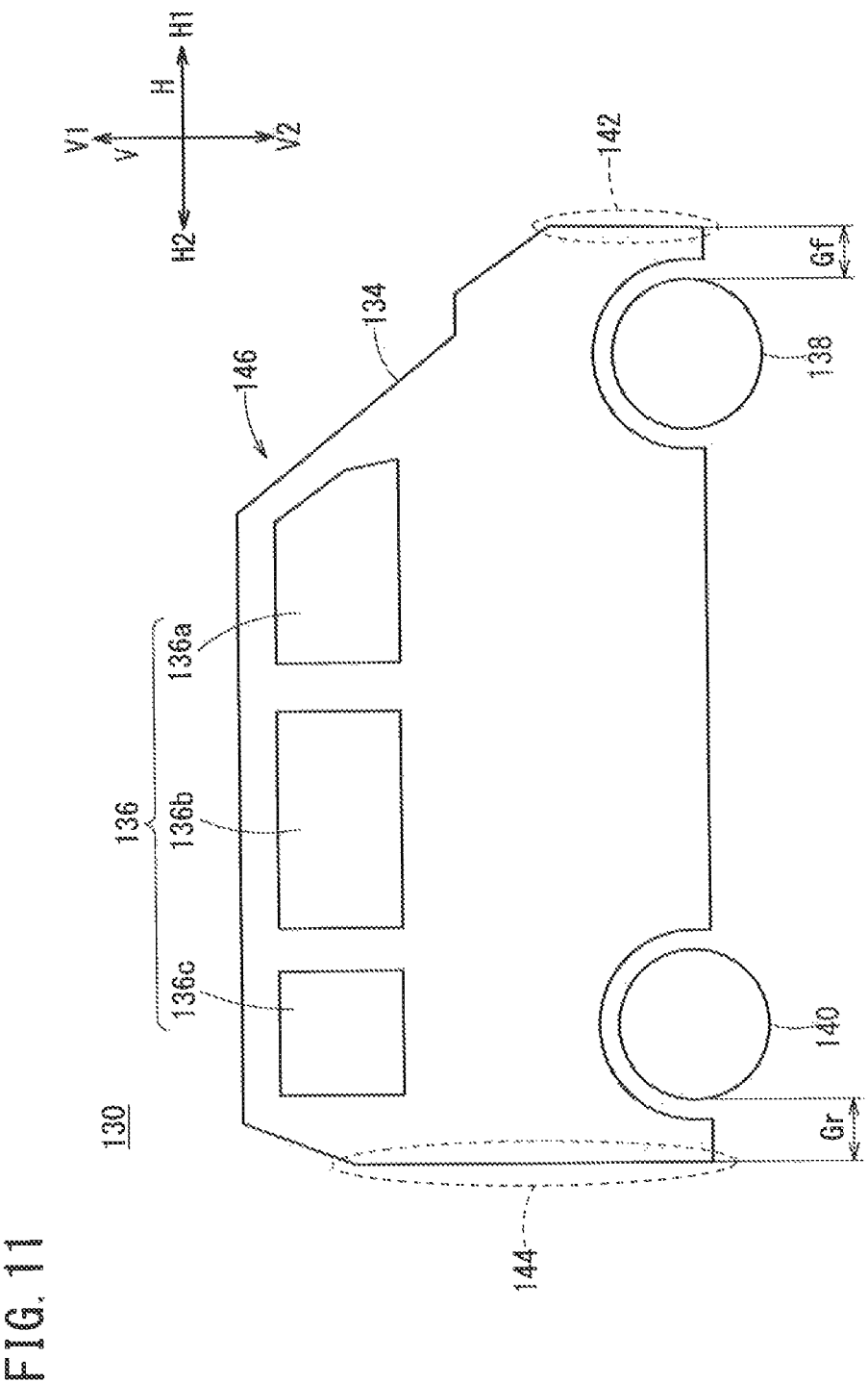
FIG. 11 is a second schematic view showing a vehicle profile included within a profile image.

FIG. 11 is a second schematic view showing a vehicle profile 146 included within the profile image 130. The vehicle profile 146 represents the profile of a right side shape of the other vehicle 82 (vehicle type B) having a front portion extending in the direction of the arrow H1, and a rear portion extending in the direction of the arrow H2. Similar to the vehicle profile 132, the vehicle profile 146 is composed primarily of a vehicle body profile 134, a window profile 136 (partial profiles 136*a*, 136*b*, 136*c*), and tire profiles 138, 140.

As can be understood from FIGS. 10 and 11, the vehicle type B (vehicle profile 146) is smaller in size than the vehicle type A (vehicle profile 132). In particular, since the length of the vehicle type B along the H-axis, i.e., the overall length of the vehicle type B, is shorter than the length of the vehicle type A, the distances Gf, Gr of the vehicle type B are smaller. Assuming that the above process of calculating a feature point is applied to the vehicle type B, the front edge 142 or the rear edge 144 may not be recognized separately, since such feature points tend to be recognized together with the tire profile 138 or 140.

If the other vehicle 82 exists at a location that is spaced from the user's own vehicle 12, then the sizes of the vehicle profiles 132, 146 in the profile image 130 are relatively small. Further, if the resolution and overall size of the profile image 130 (i.e., the captured image 92 in FIG. 4, etc.) are fixed at all times, then since the distances Gf, Gr are reduced, the front edge 142 or the rear edge 144 may potentially not be recognized in the same manner as previously described.

According to the present invention, a process of detecting the end positions of the other vehicle 82 with increased accuracy is proposed, even though the utilized captured image 92 includes a projected image of the other vehicle 82, the end shapes of which differ due to a different vehicle type or a change in the position or posture thereof.

Referring primarily to the flowcharts of FIGS. 12 and 17, an example of a process for detecting a specific object (step S2 in FIG. 3) will be described in detail. In this case, the term "specific object" refers to an object that includes at least one tire 90, 91.

The detecting process includes a process of searching for profile components that extend horizontally (along the H-axis) and vertically (along the V-axis) within the profile image 130. In such a searching process, the vehicle profiles 132, 146 may be displayed slightly obliquely to the H-axis, on account of an inclination of the roads 84, 85 (see FIG. 4, etc.) and rolling movements of the camera 34, etc.

Under the above circumstances, the present invention handles profile components, which are included within a certain range defined not only by particular directions but also by directions inclined at a certain angle to the particular directions. Directions along the H-axis, and directions that are inclined to the H-axis within an allowable range, e.g., within a range from −20 degrees to +20 degrees, will hereinafter be referred to as "substantial H-axis directions". Similarly, directions along the V-axis, and directions that are inclined to the V-axis within an allowable range, e.g., a range from −20 degrees to +20 degrees, will hereinafter be referred to as "substantial V-axis directions".

Figure 12:
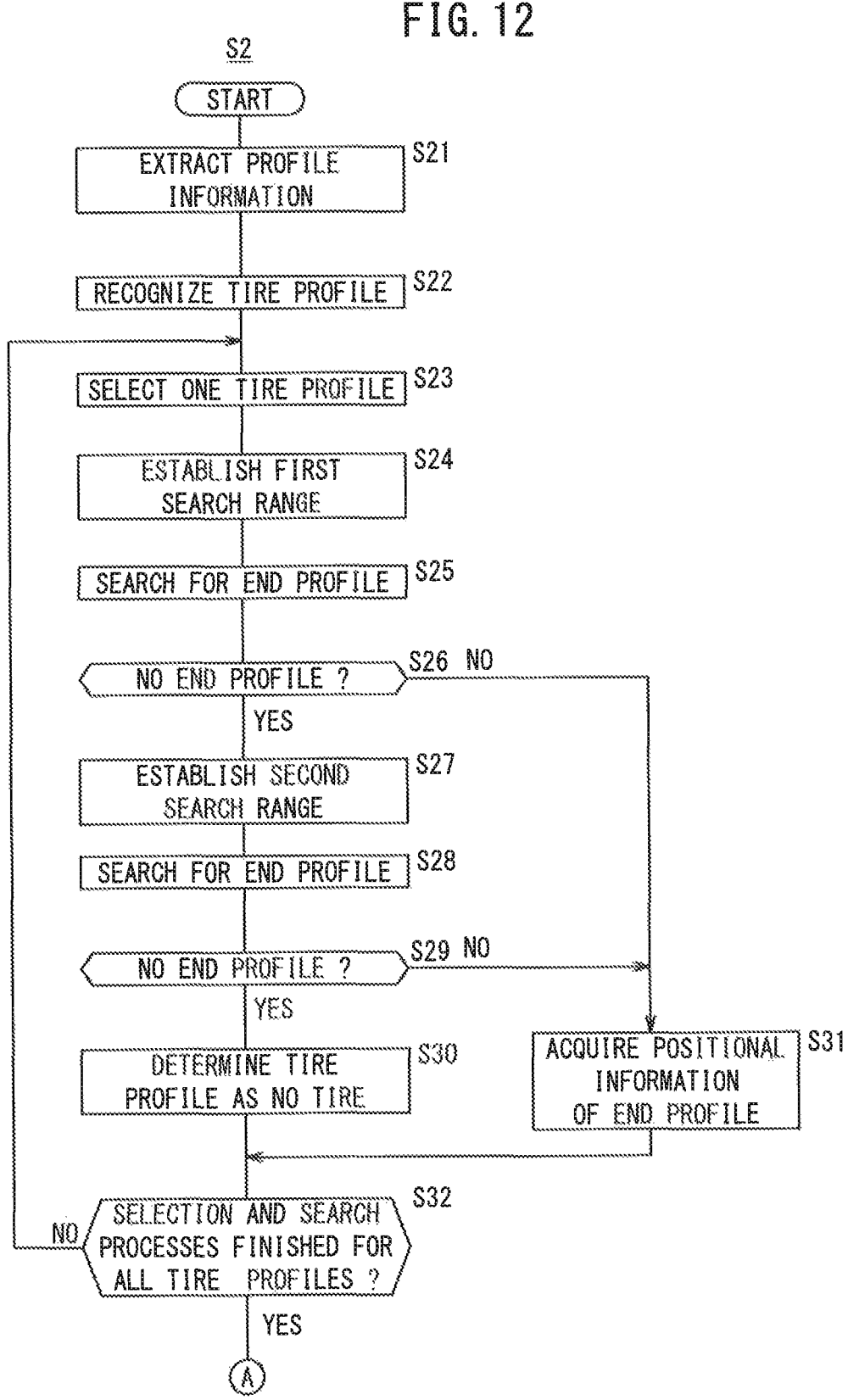
FIG. 12 is a detailed flowchart (former part) of a process of detecting a specific object (step S2 of FIG. 3)

In step S21 of FIG. 12, the profile information extractor 58 (profile information extracting unit) carries out a profile information extracting process on the captured image 92 (see FIG. 4, etc.) that includes the other vehicle 82 having the tires 90, 91, thereby acquiring profile information. The profile information extracting process may be any known extracting process including a Sobel, Roberts, and Prewitt filtering process. In this case, it is assumed that a profile image 130 (see FIG. 11) is obtained in which profile information is represented by binary values, i.e., ON and OFF values.

In step S22, the tire profile recognizer 60 (tire profile recognizing unit) recognizes tire profiles 138, 140 representing the tires 90, 91 (see FIG. 4, etc.) from within the profile image 130 that was acquired in step S21. More specifically, the tire profile recognizer 60 recognizes tire profiles 138, 140 having a circular or elliptical shape, according to an image recognition process such as a Hough transform or the like.

In step S23, the mobile object end recognizer 62 (mobile object end recognizing unit) selects one, which has not yet been selected, from among the tire profiles 138, 140 that were recognized in step S22. At first, it is assumed that the mobile object end recognizer 62 selects the front tire profile 138.

In step S24, the first search range establisher 64 establishes first search ranges 150, 151 using the position of the tire profile 138 as a reference. The first search ranges 150, 151 are ranges for determining whether or not an end profile 166 (see FIG. 14B) is included within the vehicle body profile 134. The first search ranges 150, 151 may be of any desired size.

Figure 13:
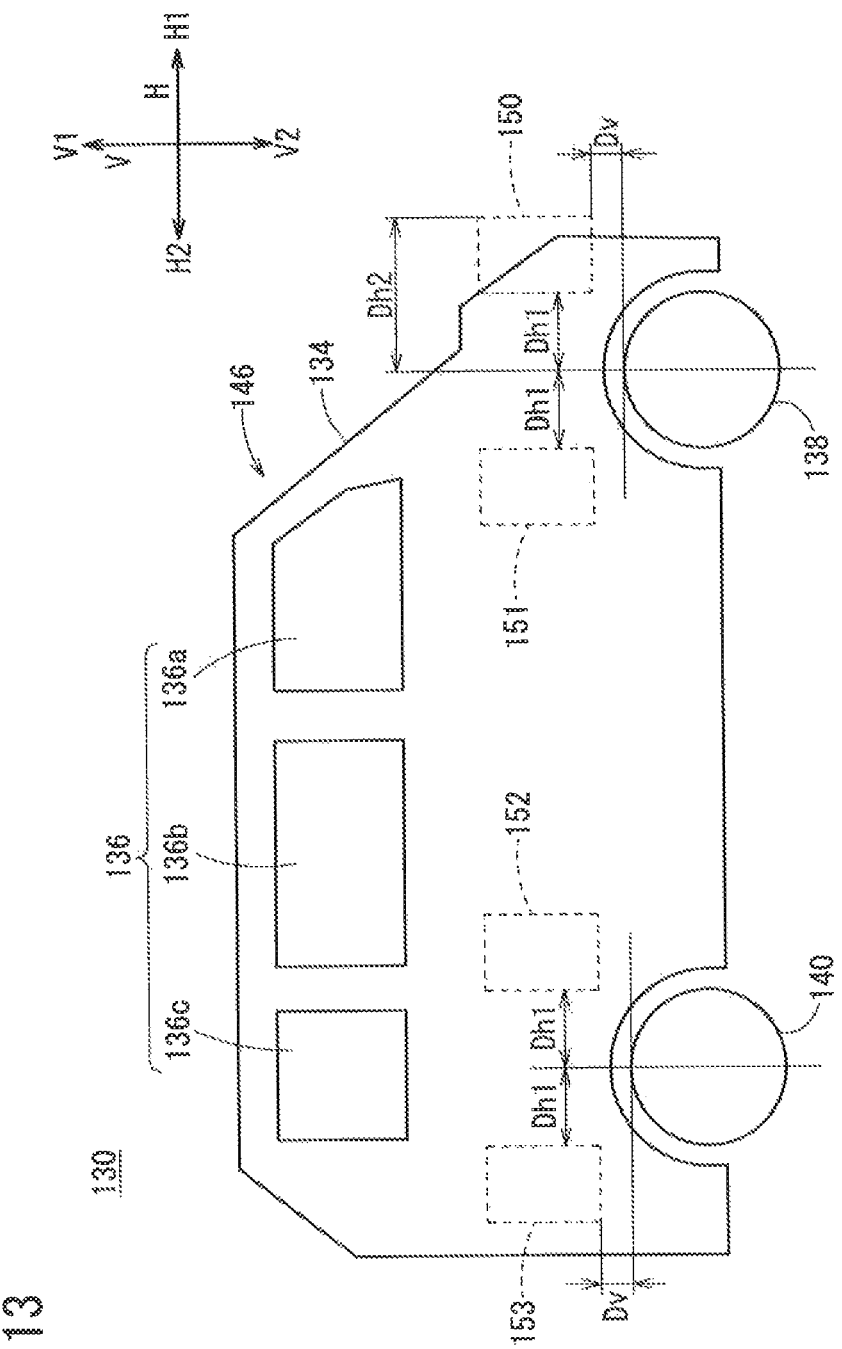
FIG. 13 is a schematic view illustrating a process of establishing first search ranges.

FIG. 13 is a schematic view illustrating a process of establishing first search ranges 150 through 153. The first search ranges 150, 151 are established in respective positions, which are spaced from the position of the tire profile 138 (a center of the circular shape thereof) by a shortest distance Dh1 and a longest distance Dh2 (>Dh1) along the H-axis. In addition, the first search ranges 150, 151 are spaced upwardly from the position of the tire profile 138 in the direction of the arrow V1. In FIG. 13, two other first search ranges 152, 153 for the rear tire profile 140 also are shown for illustrative purposes.

Depending on how the profile image 130 is plotted, it may be difficult to ascertain whether the tire profile 138 is a front tire profile or a rear tire profile. In view of this difficulty, the first search ranges 150, 151 are established axisymmetrically along the H-axis with respect to the tire profile 138.

In step S25, the mobile object end recognizer 62 determines whether or not an end profile 166 (see FIG. 14B) exists that serves as a portion of the vehicle profile 146, within a range including the first search ranges 150, 151 that were established in step S24. More specifically, the mobile object end recognizer 62 performs a search process to search for a substantially L-shaped edge, which exists in an edge area along the V-axis of the vehicle body profile 134. The search process will be described below with reference to FIGS. 14A and 14B.

First, the mobile object end recognizer 62 determines whether or not a segmental component (slanted component 156) that extends in one direction exists within the first search ranges 150, 151. As shown in FIG. 14A, a slanted component 156, which is indicated by a thick line, exists within the first search range 150. The direction along which the slanted component 156 extends is inclined at a tilt angle θ with respect to the V-axis. The tilt angle θ (units: degrees) may be of any value in the range of 0≤|θ|<90. Further, a limiting condition (e.g., the aforementioned allowable range or another condition) may be applied to the search process.

Secondly, the mobile object end recognizer 62 determines whether or not a vertical component (hereinafter referred to as a "first vertical component 160") exists, which extends downwardly in the direction of the arrow V2, essentially along the V-axis, from a lower endpoint 158 of the slanted component 156. As shown in FIG. 14B, a first vertical component 160, which is indicated by a thick line, exists across a lower boundary line of the first search range 150.

Thirdly, as shown in FIG. 14B, the mobile object end recognizer 62 recognizes a horizontal component (hereinafter referred to as a "first horizontal component 164", indicated by a thick line), which extends essentially along the H-axis from a lowermost point 162 of the first vertical component 160.

Then, the mobile object end recognizer 62 recognizes a joined combination, which is made up from the first vertical component 160 and the first horizontal component 164, as an end profile 166.

According to the above first through third procedures, the mobile object end recognizer 62 searches successively for the slanted component 156, the first vertical component 160, and the first horizontal component 164. The mobile object end recognizer 62 completes the search process upon failing to recognize even one of the above components. As a result, based on the results of the search process in the first search range 150, the mobile object end recognizer 62 recognizes that "the end profile 166 exists". Further, based on the results of the search process in the first search range 151, the mobile object end recognizer 62 recognizes that "no end profile exists".

The mobile object end recognizer 62 may search for the slanted component 156 that extends in one direction in the first search range 150, and thereafter, may search for the first vertical component 160, which extends downwardly essentially along the V-axis from the lower endpoint 158 of the slanted component 156, to thereby recognize the end profile 166. In this manner, the accuracy with which a substantially L-shaped edge (a joined combination of the slanted component 156 and the first vertical component 160) can be recognized is increased.

In step S26, the mobile object end recognizer 62 determines whether or not end profiles 166, 176 exist on the basis of the search result obtained in step S25. In the example shown in FIGS. 13 through 14B, since the end profile 166 was determined to exist (step S26: NO), control proceeds to step S31.

In step S31, the mobile object end recognizer 62 acquires positional information of the end profile 166 that was recognized in step S25. In addition to image data of the end profile 166, the positional information of the end profile 166 may include the coordinates of the lowermost point 162, the direction of the first vertical component 160, the direction of the first horizontal component 164, and the central coordinates and radius of the tire profile 138, etc.

In step S32, the mobile object end recognizer 62 determines whether or not the selection and search processes have been completed with respect to all of the tire profiles 138, 140. If the mobile object end recognizer 62 determines that the selection and search processes have not been completed (step S32: NO), control returns to step S23, and the processing sequence from step S24 is repeated on another newly selected tire profile 140.

Returning to FIG. 13, an end profile 176 (see FIG. 16B), which is included within the vehicle body profile 134, does not exist in either one of the first search ranges 152, 153. In other words, the mobile object end recognizer 62 determines that an end profile 176 does not exist on the basis of the search result that was carried out in step S25 (step S26: YES), whereupon control proceeds to step S27.

In step S27, the second search range establisher 66 establishes second search ranges 167, 168 using the position of the tire profile 140 as a reference. The second search ranges 167, 168 are ranges for determining whether or not an end profile 176 (see FIG. 16B) is included within the vehicle body profile 134. The second search ranges 167, 168 may be of a size, which is the same as or different from the size of the first search ranges 150 through 153.

FIG. 15 is a schematic view illustrating a process of establishing second search ranges 167, 168. The second search ranges 167, 168 are established in respective positions, which are spaced from the position of the tire profile 140 (a center of the circular shape thereof) by a shortest distance Dh2 along the H-axis. In view of the difficulty in ascertaining whether the tire profile 140 is a front tire profile or a rear tire profile, the second search ranges 167, 168 are established axisymmetrically along the H-axis with respect to the tire profile 140.

In step S28, the mobile object end recognizer 62 determines whether or not an end profile 176 (see FIG. 16B) exists that serves as a portion of the vehicle profile 146, within a range including the second search ranges 167, 168 that were established in step S27. More specifically, the mobile object end recognizer 62 performs a search process to search for an edge area along the V-axis of the vehicle body profile 134. The search process will be described below with reference to FIGS. 16A and 16B.

First, the mobile object end recognizer 62 determines whether or not a vertical component, which extends downwardly in the direction of the arrow V2 essentially along the V-axis, exists within the second search ranges 167, 168. As shown in FIG. 16A, a segmental component 169, which is indicated by a thick line, exists within the second search range 168.

Secondly, the mobile object end recognizer 62 searches for a lowermost point 172 of a vertical component (hereinafter referred to as a "second vertical component 170") including the segmental component 169. As shown in FIG. 16B, a second vertical component 170, which is indicated by a thick line, exists across a lower boundary line of the second search range 168.

Thirdly, as shown in FIG. 16B, the mobile object end recognizer 62 recognizes a horizontal component (hereinafter referred to as a "second horizontal component 174", indicated by a thick line), which extends essentially along the H-axis from a lowermost point 172 of the second vertical component 170.

Then, the mobile object end recognizer 62 recognizes a joined combination, which is made up from the second vertical component 170 and the second horizontal component 174, as an end profile 176.

According to the above first through third procedures, the mobile object end recognizer 62 searches successively for the second vertical component 170 including the segmental component 169, and the second horizontal component 174. The mobile object end recognizer 62 completes the search process upon failing to recognize even one of the above components. As a result, based on the results of the search process in the second search range 167, the mobile object end recognizer 62 recognizes that "a second end profile does not exist". Further, based on the results of the search process in the second search range 168, the mobile object end recognizer 62 recognizes that "the end profile 176 exists".

The mobile object end recognizer 62 may search for the second vertical component 170 (segmental component 169), which extends downwardly essentially along the V-axis in the second search range 168, to thereby recognize the end profile 176. In this manner, the accuracy with which an edge area (second vertical component 170) that extends along the V-axis can be recognized is increased.

If the mobile object end recognizer 62 fails to recognize an end profile 176 on the basis of the search results in the first search ranges 152, 153, the mobile object end recognizer 62 may ascertain whether or not at least a portion (segmental component 169) of the end profile 176 exists in the second search ranges 167, 168, to thereby recognize the end profile 176. The two search ranges are established in respective different positions, and the search process is carried out successively in the first search range 152 (153) and the second search range 167 (168). Consequently, the required amount of processing is smaller than if the search process were carried out simultaneously in the two search ranges.

In the example shown in FIG. 12, the search process is carried out in the first search ranges 150 through 153 (step S24) and the second search ranges 167, 168 (step S27) in this order. However, the search process may be carried out in the opposite order and still achieve the same advantages as described above.

In step S29, the mobile object end recognizer 62 determines whether or not end profiles 166, 176 exist on the basis of the search result obtained in step S28. In the example shown in FIGS. 15 through 16B, since the end profile 176 was determined to exist (step S29: NO), control proceeds to step S31. Thereafter, in step S31, the mobile object end recognizer 62 acquires positional information of the end profile 176 that was recognized by the search process.

On the other hand, if the mobile object end recognizer 62 determines that end profiles 166, 176 do not exist (step S29: YES), then in step S30, the target object detector 50 determines that the tire profiles 138, 140, which were recognized in step S22, do not represent tires. The phrase, "the tire profiles 138, 140 do not represent tires" implies not only that the tire profiles 138, 140 literally do not represent tires, but also that the tire profiles 138, 140 do not represent tires that exist in the vicinity of front and rear ends of the other vehicle 82.

In step S32, if the mobile object end recognizer 62 determines that the selection and search processes have been completed with respect to all of the tire profiles 138, 140 (step S32: YES), control proceeds to step S33 of FIG. 17.

Figure 17:
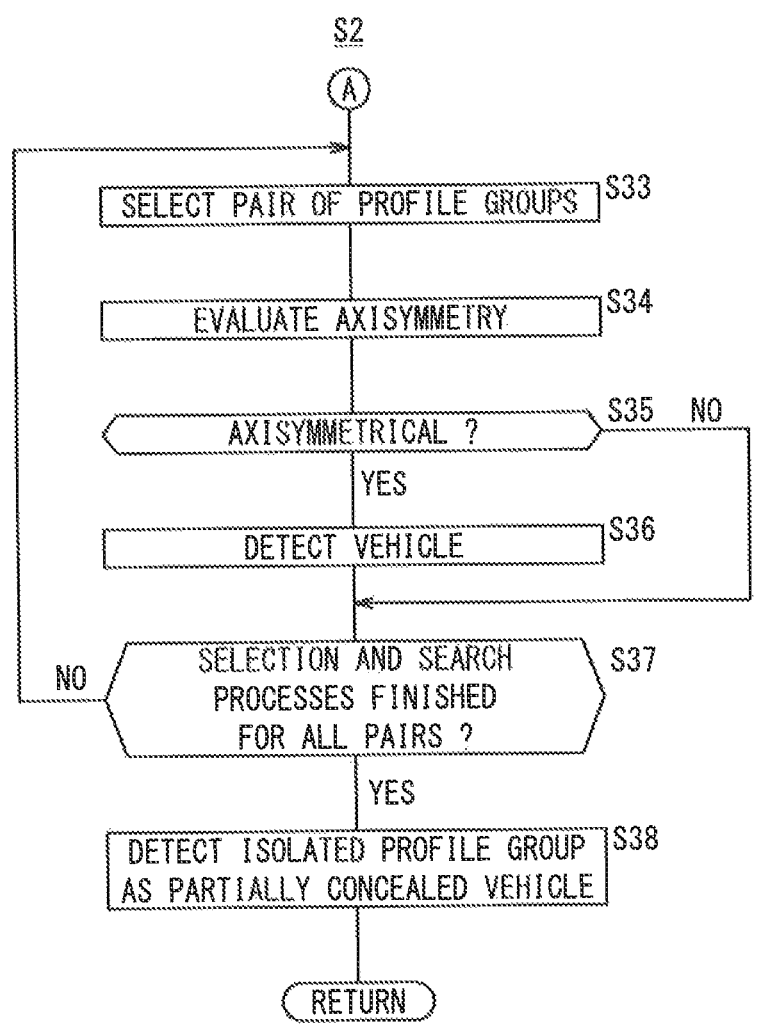
FIG. 17 is a detailed flowchart (latter part) of the process of detecting a specific object (step S2 of FIG. 3)

In step S33 of FIG. 17, the type determiner 68 selects a pair of unselected profile groups from among a plurality of combinations of the profile groups. In this case, it is assumed that the type determiner 68 selects a pair made up from a first group including the tire profile 138 and the end profile 166, and a second group including the tire profile 140 and the end profile 176.

In step S34, the type determiner 68 evaluates an axisymmetrical relationship of the pair of profile groups that were selected in step S31. An example of such an evaluation process will be described below with reference to FIG. 18.

FIG. 18 shows in a right section thereof positional information of a first group. The positional information includes a feature point E1 representing the position of the lowermost point 162, a directional vector Vch1 representing the direction of the first horizontal component 164, a directional vector Vcv1 representing the direction of the first vertical component 160, a feature point C1 representing a central position of the tire profile 138, and a radius R1 representing the size of the tire profile 138.

FIG. 18 shows in a left section thereof positional information of a second group. The positional information includes a feature point E2 representing the position of the lowermost point 172, a directional vector Vch2 representing the direction of the second horizontal component 174, a directional vector Vcv2 representing the direction of the second vertical component 170, a feature point C2 representing a central position of the tire profile 140, and a radius R2 representing the size of the tire profile 140.

The type determiner 68 evaluates the axisymmetrical relationship by taking into account [1] whether or not the midpoint between the feature points E1, E2 exists on an axis of symmetry 180, [2] whether or not the midpoint between the feature points C1, C2 exists on the axis of symmetry 180, [3] whether or not the directional vectors Vch1, Vch2 extend parallel to each other, [4] whether or not the directional vectors Vcv1, Vcv2 extend parallel to each other, and [5] whether or not the radius R1 is equal to the radius R2.

In step S35, the type determiner 68 determines whether or not the selected pair of profile groups is axisymmetrical on the basis of the evaluation result obtained in step S34. If the type determiner 68 determines that the selected pair of profile groups is not axisymmetrical (step S35: NO), the control skips step S36 and proceeds to step S37. On the other hand, if the type determiner 68 determines that the selected pair of profile groups is axisymmetrical (step S35: YES), control proceeds to step S36.

In step S36, the type determiner 68 detects a "vehicle" having two or more recognized tires 90, 91 (see FIG. 4, etc.) on the basis of the existence of the tire profiles 138, 140, which make up a portion of the pair of profile groups.

At this time, the type determiner 68 may also determine the type of the other vehicle 82 (vehicle type A shown in FIG. 10, or vehicle type B shown in FIG. 11) depending on whether the mobile object end recognizer 62 has searched for the end profiles 166, 176 in the first search ranges 150 through 153 or the second search ranges 167, 168. In this manner, a specific morphological feature, i.e., the type, of the other vehicle 82, can be acquired.

In step S37, the type determiner 68 determines whether or not the selection and search processes have been completed with respect to all of the pairs. If the mobile object end recognizer 62 determines that the selection and search processes have not been completed (step S37: NO), control returns to step S33, and the processing sequence from step S34 to step S36 is repeated on a newly selected pair of profile groups. On the other hand, if the mobile object end recognizer 62 determines that the selection and search processes have been completed (step S37: YES), control proceeds to step S38.

In step S38, on the basis of the existence of an isolated remaining profile group, the type determiner 68 detects a "partially concealed vehicle" having one recognized tire 90 (see FIG. 8A). More specifically, the target object detector 50 detects a "vehicle" from within the vehicle areas 96 (see FIG. 5) and 106 (see FIG. 8B), and detects a "partially concealed vehicle" from within the vehicle area 96 (see FIGS. 8B, 9B).

In this manner, the type determiner 68 classifies the tire profile 138 (140), which was recognized by the tire profile recognizer 60, and the end profile 166 (176), which was recognized by the mobile object end recognizer 62, into a profile group, and determines the number of tires 90, 91 that the specific object has on the basis of the symmetry along the H-axis of each member of the profile group. Accordingly, a feature of the specific object, which indicates whether or not the specific object is a mobile object, or which indicates the number of tires of the specific object, can be detected with a high level of accuracy, even though the utilized image processing technique is highly simple.

[Second Advantage of Driving Assistance Apparatus 10]

The driving assistance apparatus 10 includes the profile information extractor 58 for acquiring the profile image 130 by performing the profile extracting process on the captured image 92 in which the other vehicle 82 with the tires 90, 91 is included, the tire profile recognizer 60 for recognizing from within the profile image 130 the tire profiles 138, 140 that represent the shape of the tires 90, 91, and the mobile object end recognizer 62 for recognizing the end profiles 166, 176 that represent the ends along the H-axis of the other vehicle 82 that are positioned near the tire profiles 138, 140.

The mobile object end recognizer 62 includes the first search range establisher 64 for establishing the first search ranges 150 through 153 for searching for the end profiles 166, 176, at respective positions spaced from the positions of the tire profiles 138, 140 by distances along the H-axis which are equal to or less than a threshold value (Dh2), and which are spaced upwardly along the V-axis from the positions of the tire profiles 138, 140. The mobile object end recognizer 62 determines whether or not at least a portion of the end profile 166 exists within the first search ranges 150 through 153, thereby recognizing the end profile 166.

With the above arrangement, it is possible to determine whether or not the end profiles 166, 176 exist on the basis of area profiles that are spaced from the tire profiles 138, 140 by distances that are greater in the of the arrow V1 than along the H-axis. As a consequence, the accuracy with which the tire profiles 138, 140 and the end profiles 166, 176 can be differentiated and recognized is increased. Further, provided that the captured image 92 is used, the accuracy with which the end positions of the other vehicles 82, 102 can be detected is increased, even if the other vehicles 82, 102 are of a different type, or the position and/or attitude of the other vehicles 82, 102 is changed. As a result, the time required to recognize the mobile object can be shortened.

[Supplemental Features]

The present invention is not limited to the embodiment described above. It goes without saying that various features of the invention may be freely modified without departing from the scope of the invention.

In the illustrated embodiment, a monocular camera (camera 34) is used as the image capturing unit. However, the image capturing unit may be a multiocular camera (stereo camera). The image capturing unit may be an infrared camera instead of a color camera. Alternatively, the image capturing unit may include both an infrared camera and a color camera.

In the illustrated embodiment, the driving assistance apparatus 10 is mounted entirely on the user's own vehicle 12. However, the driving assistance apparatus 10 may be configured in other ways. For example, a captured image signal, which is acquired from the image capturing unit on the user's own vehicle 12, may be transmitted via a wireless transmitting unit to a separate processor (including the driving assistance ECU 28). Alternatively, the image capturing unit may be disposed at a fixed point outside of the user's own vehicle 12, for thereby capturing an image of an area around the periphery of the user's own vehicle 12 from outside of the user's own vehicle 12.

In the illustrated embodiment, the driving assistance apparatus 10 is applied to a four-wheel vehicle (a vehicle in a narrow sense). However, the driving assistance apparatus 10 may be applied to all types of mobile objects. Mobile objects to which the present invention may be applied include vehicles in a wide sense, such as bicycles, ships, aircrafts, artificial satellites, or the like, for example.

What is claimed is:

1. A mobile object control apparatus comprising:
    an image capturing unit configured to acquire a captured image representing an area around the periphery of a mobile object, the captured image being captured while the mobile object is moving;
    an object detecting unit configured to detect a specific object having a tire as a target object based on the captured image acquired by the image capturing unit;
    a movement predicting unit configured to start to predict a movement of the specific object if the object detecting unit detects the specific object having at least one tire; and
    a mobile object control unit configured to control a behavior of the mobile object in view of the movement of the specific object that is predicted by the movement predicting unit,
    wherein the object detecting unit comprises:
        a tire profile recognizer configured to recognize a tire profile, which represents a shape of the tire, from within profile information of the captured image;
        an end recognizer configured to recognize an end profile, which represents a shape of a horizontal end of the specific object that is positioned near the tire profile; and
        a type determiner configured to classify the tire profile, which was recognized by the tire profile recognizer, and the end profile, which was recognized by the end recognizer, into a profile group, and determine a number of tires that the specific object has based on a horizontal symmetry of each member of the profile group.

2. The mobile object control apparatus according to claim 1, wherein:
    the movement predicting unit predicts whether or not a possibility exists for the specific object to contact the mobile object; and
    the mobile object control unit performs a decelerating/stopping control process for decelerating or stopping the mobile object if the movement predicting unit predicts that a possibility exists for the specific object to contact the mobile object.

3. The mobile object control apparatus according to claim 2, wherein the mobile object control unit performs the decelerating/stopping control process if the movement predicting unit predicts that a possibility exists for the specific object, which has at least two tires, to contact the mobile object.

4. The mobile object control apparatus according to claim 2, wherein the mobile object control unit performs the decelerating/stopping control process if the specific object is positioned near another target object having at least two tires, and the movement predicting unit predicts that a possibility exists for the specific object to contact the mobile object.

5. The mobile object control apparatus according to claim 3, wherein the mobile object control unit performs the decelerating/stopping control process if the specific object is positioned near another target object having at least two tires, and the movement predicting unit predicts that a possibility exists for the specific object to contact the mobile object.

6. The mobile object control apparatus according to claim 2, wherein the mobile object control unit performs the decelerating/stopping control process if the specific object having at least one tire moves near a stationary object as another target object, and the movement predicting unit predicts that a possibility exists for the specific object to contact the mobile object.

7. An object detecting apparatus comprising:
   a profile extracting unit configured to acquire a profile image by performing a profile extracting process on a captured image in which a mobile object having a tire is included;
   a tire profile recognizing unit configured to recognize a tire profile, which represents a shape of the tire, from within the profile image acquired by the profile extracting unit;
   a mobile object end recognizing unit configured to recognize an end profile, which represents a horizontal end of a mobile object positioned near the tire profile that was recognized by the tire profile recognizing unit; and
   a mobile object control unit configured to control a behavior of the mobile object in view of the movement of the specific object that is predicted by the movement predicting unit,
   wherein the mobile object end recognizing unit further comprises:
      a first search range establisher configured to establish a first search range for searching for the end profile, at a position spaced from the position of the tire profile by a horizontal distance that is equal to or less than a threshold value, and which is spaced upwardly vertically from the position of the tire profile; and
      the mobile object end recognizing unit determines whether or not at least a portion of the end profile exists within the first search range, thereby recognizing the end profile.

8. The object detecting apparatus according to claim 7, wherein the mobile object end recognizing unit searches within the first search range for a segmental component, which extends in one direction, and thereafter searches for a first vertical component, which extends downwardly along a vertical direction or a direction inclined within an allowable range to the vertical direction, from a lower endpoint of the segmental component, thereby recognizing the end profile.

9. The object detecting apparatus according to claim 7, wherein the mobile object end recognizing unit further comprises:
   a second search range establisher configured to establish a second search range for searching for the end profile, at a position spaced from the position of the tire profile by a horizontal distance that is greater than the threshold value; and
   if the mobile object end recognizing unit fails to recognize the end profile that was searched for within the first search range, the mobile object end recognizing unit determines whether or not at least a portion of the end profile exists within the second search range established by the second search range establisher, thereby recognizing the end profile.

10. The object detecting apparatus according to claim 9, wherein the mobile object end recognizing unit searches within the second search range for a second vertical component, which extends downwardly along a vertical direction or a direction inclined within an allowable range to the vertical direction, thereby recognizing the end profile.

11. The object detecting apparatus according to claim 9, further comprising:
   a type determiner configured to determine a type of the mobile object depending on whether the mobile object end recognizing unit has searched for the end profile in the first search range or in the second search range.

* * * * *